United States Patent
Kurabayashi

(10) Patent No.: US 12,458,879 B2
(45) Date of Patent: Nov. 4, 2025

(54) METHOD, PROGRAM, AND ELECTRONIC DEVICE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 560 days.

(21) Appl. No.: 18/054,005

(22) Filed: Nov. 9, 2022

(65) Prior Publication Data

US 2023/0117127 A1    Apr. 20, 2023

Related U.S. Application Data

(63) Continuation of application No. PCT/JP2021/017826, filed on May 11, 2021.

(30) Foreign Application Priority Data

May 15, 2020    (JP) ................................. 2020-085896

(51) Int. Cl.
*A63F 13/426*    (2014.01)
*A63F 13/2145*    (2014.01)
*G06F 3/041*    (2006.01)

(52) U.S. Cl.
CPC ........ *A63F 13/426* (2014.09); *A63F 13/2145* (2014.09); *G06F 3/0416* (2013.01)

(58) Field of Classification Search
CPC .... A63F 13/426; A63F 13/2145; A63F 13/42; A63F 13/55; G06F 3/0488
See application file for complete search history.

(56) References Cited

U.S. PATENT DOCUMENTS

| 12,128,309 B2 * | 10/2024 | Fu ........................... A63F 13/35 |
| 2006/0052166 A1 | 3/2006 | Ohta |

(Continued)

FOREIGN PATENT DOCUMENTS

| JP | 3734820 B1 | 1/2006 |
| JP | 2006150039 A | 6/2006 |

(Continued)

OTHER PUBLICATIONS

Office Action issued in Japanese Application No. 2020-085896; Dated Feb. 15, 2021 (9 pages).

(Continued)

*Primary Examiner* — James S. McClellan
(74) *Attorney, Agent, or Firm* — Osha Bergman Watanabe & Burton LLP

(57) ABSTRACT

One or more embodiments of the invention is a method including: retaining, as a data point sequence at intervals of a predetermined time period, at least one data point that is acquired on the basis of a touch event; determining, on the basis of a displacement of the at least one retained data point in the data point sequence, a displacement speed corresponding to a speed of displacement of the position, in the data point sequence, at which the touch event has been generated and determining a weighted speed on the basis of at least a bias of the latest determined displacement speed with respect to the mean value of displacement speeds determined before the latest displacement speed; and inputting the determined weighted speed into a predetermined function, thereby determining a converted weighted speed for determining a parameter of an operated object in a virtual space.

11 Claims, 11 Drawing Sheets

(56) References Cited

U.S. PATENT DOCUMENTS

| | | |
|---|---|---|
| 2006/0094502 A1 | 5/2006 | Katayama |
| 2010/0022304 A1 | 1/2010 | Katayama |
| 2011/0025628 A1* | 2/2011 | Lin .................... G06F 3/04883 |
| | | 345/173 |
| 2013/0181924 A1* | 7/2013 | Hong .................... G06F 3/0488 |
| | | 345/173 |
| 2013/0267316 A1 | 10/2013 | Ohta |
| 2015/0253943 A1* | 9/2015 | Yu ....................... G06F 3/04842 |
| | | 715/739 |
| 2017/0168711 A1* | 6/2017 | Temple ................ G06F 3/0233 |
| 2017/0319960 A1 | 11/2017 | Ohta |
| 2018/0253213 A1* | 9/2018 | Wang .................... G06F 3/0488 |
| 2018/0373376 A1 | 12/2018 | Kurabayashi |
| 2020/0398151 A1* | 12/2020 | Zhang .................... G06F 3/0488 |
| 2021/0031095 A1 | 2/2021 | Ono |
| 2021/0052984 A1 | 2/2021 | Kurabayashi |
| 2021/0205698 A1 | 7/2021 | Kurabayashi |

FOREIGN PATENT DOCUMENTS

| | | |
|---|---|---|
| JP | 2006150062 A | 6/2006 |
| JP | 6005831 B1 | 10/2016 |
| JP | 6389581 B1 | 9/2018 |
| JP | 6560801 B1 | 8/2019 |
| JP | 2019133208 A | 8/2019 |
| JP | 2019187624 A | 10/2019 |

OTHER PUBLICATIONS

Office Action issued in Japanese Application No. 2020-085896; Dated Jun. 28, 2021 (6 pages).
Office Action issued in Japanese Application No. 2020-085896; Dated Nov. 17, 2021 (5 pages).
International Search Report issued in International Application No. PCT/JP2021/017826, mailed Jul. 27, 2021 (6 pages).
Written Opinion issued in International Application No. PCT/JP2021/017826; Dated Jul. 27, 2021 (5 pages).

* cited by examiner $o = a_2 s + b_2$ $o = a_3 e^s + b_3$

METHOD, PROGRAM, AND ELECTRONIC DEVICE

TECHNICAL FIELD

The present invention relates to methods, programs, and electronic devices, and particularly to a method that is executed in a computer provided with a touchscreen, a program for executing each step of the method, and an electronic device provided with a touchscreen.

BACKGROUND ART

With recent improvements in touchscreen technology, electronic devices that allow user inputs to be performed via a user interface on a touchscreen have become widely used. Furthermore, for games that are executed on an electronic device, instead of allowing user inputs to be performed via a conventional physical controller, methods for allowing user inputs to be performed via a touchscreen provided on the electronic device are becoming widely used.

In particular, as compact portable electronic devices, such as smartphones, have rapidly become popular, a large number of games that are executed on such portable electronic devices have been released. In this situation, various technologies have been proposed for a method of operating a virtual object, such as a player character, displayed on a touchscreen.

For example, PTL 1 discloses a game device provided with a touchscreen, as well as a program, that enables an operation simulating a joystick by setting an origin in accordance with a touch operation performed by a user. In this game device, reference coordinates are set on the basis of coordinates at the time detection is started as a result of a touch-undetected state on the touchscreen being changed into a touch-detected state, and in the case where touch detection is continued thereafter, instruction coordinates are set on the basis of the coordinates detected thereafter. Also, the game device recognizes the direction of a vector from the reference coordinates to the instruction coordinates as the direction in which the joystick is tilted and the magnitude of the vector as the degree by which the joystick is tilted, thereby realizing a virtual joystick for operating a virtual object.

CITATION LIST

Patent Literature

{PTL 1}
Publication of Japanese Patent No. 3734820
{PTL 2}
Publication of Japanese Patent No. 6389581
{PTL 3}
Publication of Japanese Patent No. 6560801

SUMMARY OF INVENTION

Technical Problem

In the conventional technology disclosed in PTL 1, a user places a finger at one point on the touchscreen to cause the game device to recognize the reference coordinates and then slides the finger while maintaining contact, and when sliding of the finger is ended, the game device recognizes the instruction coordinates at the contact position of the finger. With the conventional technology thus configured, when the user is to input a direction, it is necessary to generate a distance from the reference coordinates to the instruction coordinates, which makes it difficult to realize high responsiveness. For example, in the case where the user wishes to perform the operation of tilting the virtual joystick by a large amount, it is necessary to generate a magnitude of the vector from the reference coordinates to the instruction coordinates so as to correspond to the degree of tilting of the joystick to be tilted by a large amount.

In this situation, the applicants have proposed a method of determining, without using the spatial concept of a start point and an end point, parameters (e.g., direction and speed) of an operated object in a virtual space from a set of touch points generated by minute movements of a finger (PTLs 2 and 3). For a user operation via a touchscreen, however, there is a need to realize a more highly operable method as an operating method for controlling an operated object, which is an object that can be operated by the user.

The present invention has been made in order to solve the problem described above, and a main object thereof is to provide a method, etc. that makes it possible to further improve operability in operating an operated object via a touchscreen.

Solution to Problem

A method as an aspect of the present invention is a method executed in a computer provided with a touchscreen and is characterized by including:

a step of retaining, as a data point sequence at intervals of a predetermined time period, at least one data point that is acquired on the basis of a touch event generated by a user operation on the touchscreen and that is indicated by a value on a first axis and a value on a second axis;

a step of determining, on the basis of a displacement of the at least one retained data point in the data point sequence, a displacement speed corresponding to a speed of displacement of the position, in the data point sequence, at which the touch event has been generated and determining a weighted speed on the basis of at least a bias of the latest determined displacement speed with respect to the mean value of displacement speeds determined before the latest displacement speed; and a step of inputting the determined weighted speed into a predetermined function that determines a value corresponding to an input value and that retains and determines a maximum value among at least one of the determined value, thereby determining a converted weighted speed for determining a parameter of an operated object in a virtual space.

In addition, as an aspect of the present invention, in the step of retaining as a data point sequence, at least one data point is retained as a data point sequence at intervals of the time period corresponding to a frame rate, and in the step of determining a weighted speed, a displacement speed corresponding to a speed of displacement of the position in one frame at which the touch event has been generated is determined on the basis of a displacement of the at least one data point in the data point sequence retained in the time period of the one frame, and a weighted speed is determined on the basis of at least a bias of the displacement speed in the latest frame with respect to the mean value of the displacement speeds in frames before the latest frame.

In addition, as an aspect of the present invention, the above-described method includes:

a step of terminating the retention of the maximum value by means of the predetermined function when a touch event corresponding to touch end or touch cancel is generated by a user operation on the touchscreen.

In addition, as an aspect of the present invention, the predetermined function is configured to determine a value corresponding to an input value by determining, in response to an input value equal to or greater than a predetermined threshold value, a constant having a magnitude according to the predetermined threshold value.

In addition, as an aspect of the present invention, the predetermined function is configured to determine a value corresponding to an input value by applying a function for mapping one input value to one value within a certain range.

In addition, as an aspect of the present invention, the above-described method includes:

- a step of retaining a data point that is acquired on the basis of a touch event generated by a user operation on the touchscreen and that is indicated by a value on the first axis and a value on the second axis;
- a step of terminating the retention of a data point for which a predetermined retention time period has expired among a plurality of the retained data points;
- a step of determining the slope of a regression line on the basis of the plurality of retained data points;
- a step of determining an amount of rotation for rotating the determined slope of the regression line on the basis of a displacement direction as a set of the plurality of retained data points; and
- a step of determining, at intervals of the predetermined time period, an angle on the basis of the determined slope of the regression line and the determined amount of rotation.

In addition, as an aspect of the present invention, in each of the step of determining a converted weighted speed and the step of determining an angle, the converted weighted speed and the angle are determined at intervals of the predetermined time period, and the method includes a step of generating a composite vector at intervals of the predetermined time period on the basis of the determined converted weighted speed and a unit vector having the determined angle.

In addition, as an aspect of the present invention, a direction of the determined composite vector is a moving direction of the operated object, and a magnitude of the determined composite vector is a moving speed of the operated object.

In addition, as an aspect of the present invention, the method includes a step of determining a moving state of the operated object on the basis of the magnitude of the determined composite vector.

A program as an aspect of the present invention is characterized by causing a computer to execute each of the steps of the above-described method.

An electronic device as an aspect of the present invention is an electronic device provided with a touchscreen and is characterized by including:

- a functional unit for retaining, as a data point sequence at intervals of a predetermined time period, at least one data point that is acquired on the basis of a touch event generated by a user operation on the touchscreen and that is indicated by a value on a first axis and a value on a second axis;
- a functional unit for determining, on the basis of a displacement of the at least one retained data point in the data point sequence, a displacement speed corresponding to a speed of displacement of the position, in the data point sequence, at which the touch event has been generated and determining a weighted speed on the basis of at least a bias of the latest determined displacement speed with respect to the mean value of displacement speeds determined before the latest displacement speed; and
- a functional unit for inputting the determined weighted speed into a predetermined function that determines a value corresponding to an input value and that retains and determines a maximum value among at least one of the determined value, thereby determining a converted weighted speed for determining a parameter of an operated object in a virtual space.

Advantageous Effects of Invention

According to the present invention, it is possible to further improve operability in operating an operated object via a touchscreen.

DESCRIPTION OF EMBODIMENTS

Figure 1:
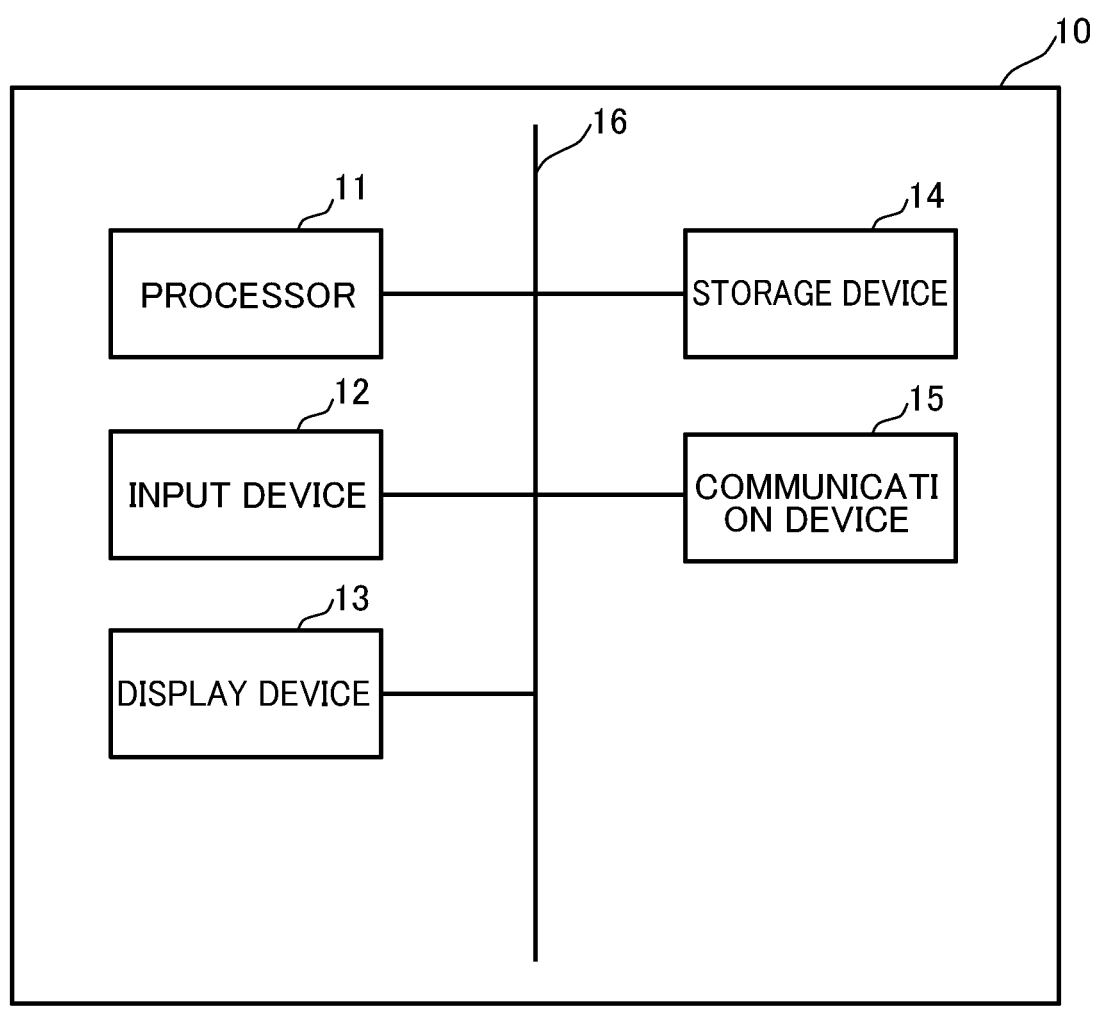
FIG. 1 is a block diagram showing the hardware configuration of an electronic device according to an embodiment of the present invention.

An embodiment of the present invention will be described below with reference to the drawings. The same reference signs in the drawings indicate the same or corresponding elements unless specifically mentioned otherwise. Furthermore, for convenience of description, there are cases where descriptions that are more detailed than necessary are omitted. For example, there are cases where detailed descriptions of matters that are already well known and repeated descriptions of substantially the same configurations are omitted. Note that, in the present description, the magnitude of a vector can mean the norm of the vector.

An electronic device 10 according to an embodiment of the present invention has installed therein a game application that proceeds with a game by presenting a user with a virtual object disposed in a virtual space. When the game application is executed, the electronic device 10 according to this embodiment provides a virtual controller for controlling, in response to a user operation, an operated object, which is a virtual object to be operated by the user in the virtual space. The virtual space and the virtual controller are defined by the game application, and the virtual space can be a two-dimensional space or a three-dimensional space. In this embodiment, the operated object is an operated character, which is a character disposed in the virtual space. In the electronic device 10, the virtual controller is used by the user to input, for example, a direction and a magnitude, thereby determining parameters such as the moving direction and speed of the operated character. It should be noted, however, that the operated object can be an item, a virtual camera, or the like disposed in the virtual space.

For convenience of description, it is assumed in this embodiment that a game application as described above is installed in the electronic device 10, but the present invention is not limited to this embodiment. It is sufficient if the electronic device 10 implements at least an application that is capable of controlling the operated object in response to a user operation. For example, instead of or in addition to the game application, an input support application or a simulation application for causing the operated object to act in response to a user operation may be implemented in the electronic device 10. In the following description, the term "application" refers to application programs in general and can refer to applications that are installed in a smartphone or a tablet terminal.

FIG. 1 is a block diagram showing the hardware configuration of the electronic device 10 according to an embodiment of the present invention. The electronic device 10 includes a processor 11, an input device 12, a display device 13, a storage device 14, and a communication device 15. These constituent devices are connected via a bus 16. It is assumed that interfaces are interposed as needed between the bus 16 and the individual constituent devices. In this embodiment, the electronic device 10 is a smartphone. Alternatively, the electronic device 10 may be a tablet computer, a computer equipped with a contact-type input device such as a touchpad, or the like, as long as the computer includes the configuration described above.

The processor 11 controls the overall operation of the electronic device 10. For example, the processor 11 is a CPU. Alternatively, an electronic circuit such as an MPU may be used as the processor 11. The processor 11 executes various types of processing by reading programs and data stored in the storage device 14 and executing the programs. In an example, the processor 11 is configured from a plurality of processors.

The input device 12 is a user interface for accepting inputs to the electronic device 10 from the user. The display device 13 is a display for presenting the user of the electronic device 10 with application screens, etc. under the control of the processor 11. In this embodiment, the input device 12 is a touchscreen 12, and the input device 12 and the display device 13 (display) have an integrated structure. In this embodiment, for convenience of description, the "touchscreen 12" can refer to the input device 12 and the display device 13. However, the input device 12 can also be a touch pad, and the display device 13 can correspondingly be a display separate from the touchscreen.

The storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that are used by the processor 11 when the individual programs are executed. The auxiliary storage device is, for example, a hard disk device, but may be a non-volatile storage or a non-volatile memory, and moreover may be of a removable type, as long as the device can store information. In an example, the storage device 14 is a storage device provided by a typical smartphone, including a volatile memory and a non-volatile memory. The storage device 14 stores various programs, including the game application. For example, the storage device 14 stores an operating system (OS), middleware, application programs, various items of data that may be referred to when these programs are executed, etc.

The communication device 15 is a wireless LAN module capable of transmitting data to and receiving data from another computer, such as a user terminal or a server, via a network. However, the communication device 15 can be any other wireless communication device, such as a Bluetooth® module, or a wired communication device, such as an Ethernet module or a USB interface. In an example, the electronic device 10 downloads a program from a server by means of the communication device 15 and stores the program in the storage device 14. In the case where data is neither transmitted to nor received from another computer, the electronic device 10 need not include the communication device 15.

Figure 2:
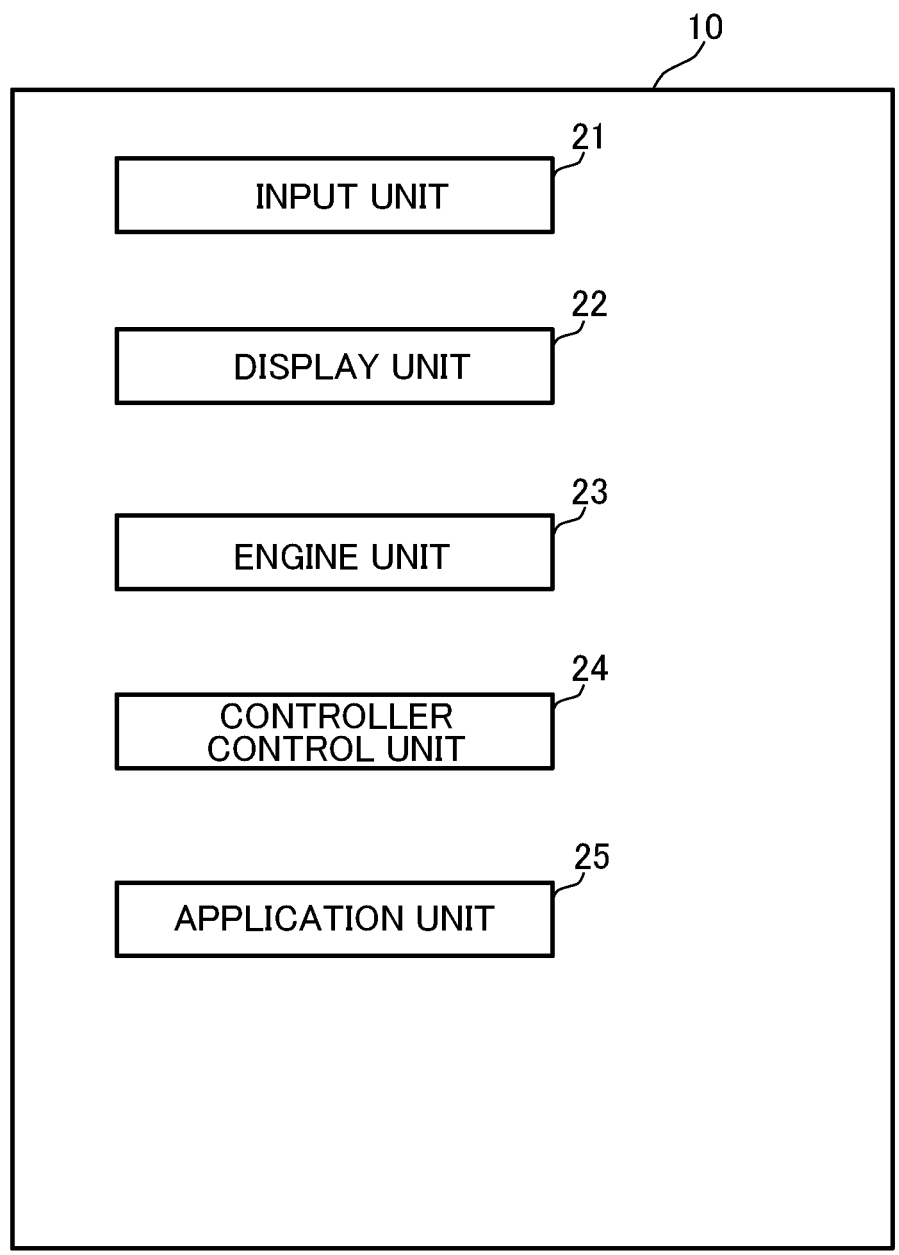
FIG. 2 is a functional block diagram of the electronic device according to an embodiment of the present invention.

FIG. 2 is a functional block diagram of the electronic device 10 according to an embodiment of the present invention. The electronic device 10 includes an input unit 21, a display unit 22, an engine unit 23, a controller control unit 24, and an application unit 25. In this embodiment, these functions are realized by the processor 11 executing programs. For example, the programs that are executed are programs stored in the storage device 14 or received via the communication device 15. Since various functions are realized by reading programs, as described above, a portion or the entirety of one part (function) may be provided in another part. The other part may be one not described in this embodiment. Alternatively, these functions may be realized by means of hardware by configuring electronic circuits or the like for realizing some or all of the functions. In an example, the virtual controller is realized by a three-tier structure, where the engine unit 23, the controller control unit 24, and the application unit 25 correspond to the respective tiers. In this case, the virtual controller is realized as a result of programs including the programs corresponding to the respective tiers being executed by the processor 11.

The input unit 21 is configured by using the touchscreen 12, and accepts inputs to the electronic device 10 from the user. In this embodiment, the input unit 21 accepts a touch operation performed on the touchscreen 12 by the user and generates a touch event. The input unit 21 is a function generally provided in a smartphone.

The display unit 22 displays a game application screen (game screen) on the touchscreen 12 so as to display a screen in accordance with a user operation.

By using touch events generated by a user touch operation on the touchscreen 12, the engine unit 23 determines, at intervals of the frame time (inter-frame time) corresponding to the frame rate, a converted weighted speed for determining a parameter of an operated character. By using touch events generated by a user touch operation on the touchscreen 12, the engine unit 23 determines, at intervals of the frame time, an angle for determining a parameter of the operated character. A frame time F (seconds) is a time period corresponding to the frame rate for executing the game. The frame rate is typically 30 fps (frames per second) or 60 fps. For example, if the frame rate is 30 fps, the frame time F is 1/30 seconds. Note that, in this embodiment, the word "determining" can include calculating and determining by calculation.

Retention of a data point performed by the engine unit 23 will be described. The engine unit 23 acquires a data point indicated by the value on a first axis and the value on a second axis on the basis of a touch event generated by a user operation on the touchscreen 12. Here, a touch event includes touchstart generated when the user brings a finger into contact with the touchscreen 12, touchmove generated when the user moves the finger while keeping the finger in contact with the touchscreen 12, and touchend generated when the user removes the finger from the touchscreen 12. A touch event can also include touchcancel, which is generated when a touch is cancelled.

The engine unit 23 acquires a touch event when the touch event occurs. When acquiring a touch event, the engine unit 23 acquires a set of numerical values (x, y) consisting of two variables and corresponding to a position at which the electrostatic capacitance on the touchscreen 12 has changed, and stores the set of numerical values (x, y) in a first buffer. The data of the set of numerical values consisting of two variables is acquired by the engine unit 23 in association with a touch event, and corresponds to a data point indicated by a value on the first axis and a value on the second axis. The first buffer is an example of a storage area, in the storage device 14, that is provided for temporarily retaining data, and is not limited to such a storage area as long as the first buffer can temporarily retain data. The same also applies to other buffers.

In an example, the engine unit 23 acquires a set of numerical values (x, y) consisting of two variables and also acquires a time t at which (x, y) was acquired, thereby storing a set of numerical values (x, y, t) consisting of three variables in the first buffer. Here, the time t is a value representing a data point acquisition time, which is the time when (x, y) was acquired, and is stored in the first buffer in association with (x, y), as described above. For example, the time t can be an integer value that can be acquired from the OS, the so called UNIX® time, or can be a character string such as "2017/07/14 15:48:43.444". Hereinafter, the engine unit 23 retaining (or terminating the retention of) a data point can include retaining (or terminating the retention of) a data point acquisition time t associated with the data point.

Figure 3:
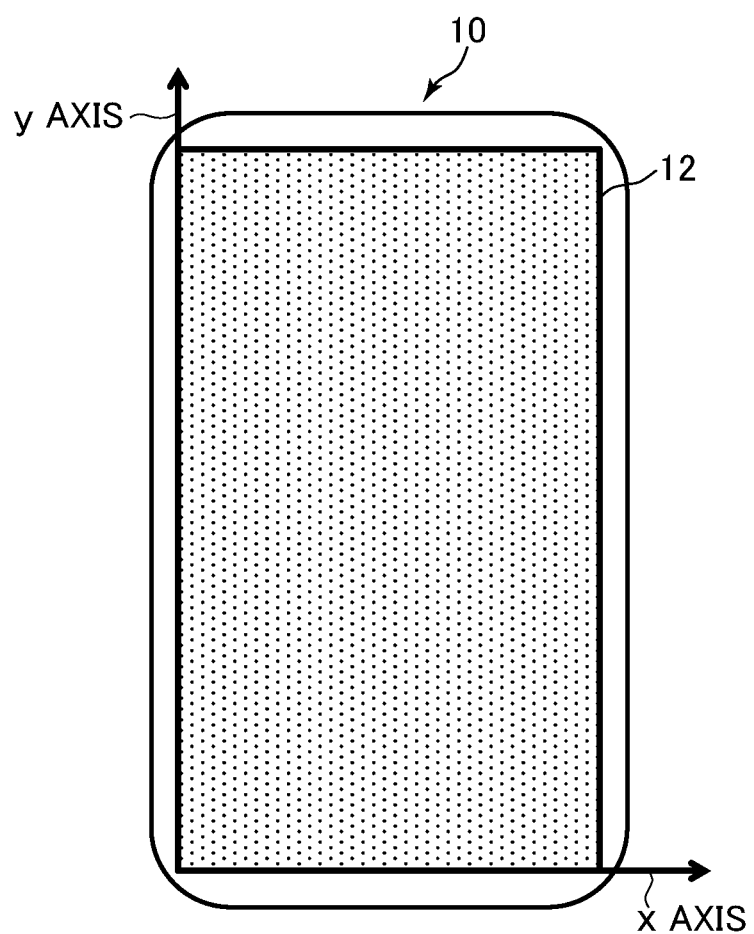
FIG. 3 is a diagram showing coordinate axes including a first axis and a second axis in this embodiment.

In this embodiment, for convenience of description, the first axis and the second axis are defined as follows. FIG. 3 is a diagram showing coordinate axes including the first axis and the second axis in this embodiment. The first axis is a horizontal axis (x axis) substantially parallel to the shorter sides of the substantially rectangular touchscreen 12. The second axis is a vertical axis (y axis) substantially parallel to the longer sides of the touchscreen 12. A position on the touchscreen 12 is expressed in the form of coordinates (x, y) along the first axis (x axis) and the second axis (y axis). Thus, in this embodiment, the coordinates (x, y) of a data point correspond to a position on the touchscreen 12, and the engine unit 23 retains the coordinates (x, y) as a data point in the first buffer. The coordinate setting shown in FIG. 3 is just an example, and coordinates may be set differently from the above example depending on the programs implemented in the electronic device 10.

Among the data points retained in the first buffer, the engine unit 23 terminates the retention of data points for which a predetermined retention time period has expired. For example, when terminating the retention of the data of a data point, the engine unit 23 may delete the data or invalidate the data, or alternatively, delete the data, as appropriate, by associating, with the data, a flag indicating that the retention of the data point has been terminated. The engine unit 23 defines a variable Da specifying, in units of milliseconds, the life of each of the data points stored in the first buffer. The time period specified by the variable Da corresponds to the predetermined retention time period. However, the value of the variable Da is not limited to milliseconds. In an example, the variable Da is set to 167, and the engine unit 23 retains the data points stored in the first buffer for 167 milliseconds. When 167 milliseconds has elapsed, the retention of the data points in the first buffer is terminated. A time period of 167 milliseconds is an example of a time period corresponding to five frames in the case where the frame rate for running the game is 30 fps.

Figure 4:
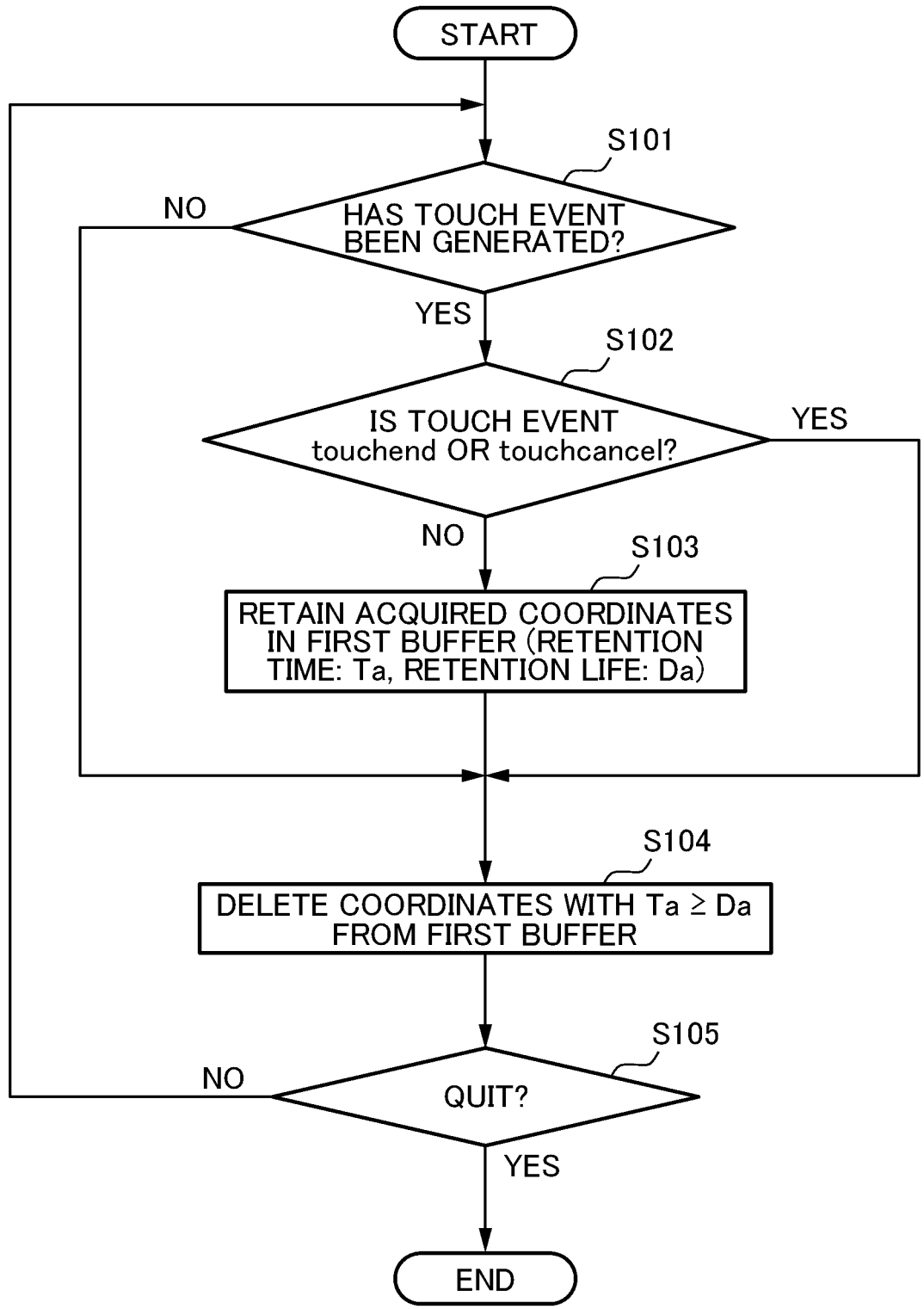
FIG. 4 is a flowchart for illustrating processing concerning the retention of a data point, which is executed in the electronic device according to an embodiment of the present invention.

FIG. 4 is a flowchart for illustrating processing concerning the retention of a data point, which is executed in the electronic device 10 according to an embodiment of the present invention.

In step 101, the engine unit 23 determines whether or not a touch event has been generated. In the case where a touch event has been generated, this flowchart proceeds to step 102, and in the case where no touch events have been generated, this flowchart skips to step 104.

In step 102, the engine unit 23 determines whether or not the generated touch event is touchend or touchcancel. In the case where the acquired touch event is not touchend or touchcancel, this flowchart proceeds to step 103. In the case where the acquired touch event is touchend or touchcancel, this flowchart skips to step 104.

In step 103, the engine unit 23 acquires a data point from the generated touch event and stores the data point in the first buffer. In an example, the engine unit 23 associates Ta and Da with the data point to be stored, where Ta indicates the elapsed time in milliseconds after the storage of the data point and Da indicates the time in milliseconds for which the data point can be stored in the first buffer.

In step 104, among the data points retained in the first buffer, the engine unit 23 terminates the retention of the data point the elapsed time Ta of which is equal to or greater than the variable Da. In an example, for each of the data points stored in the first buffer, the engine unit 23 compares the elapsed time Ta with the variable Da and, if the elapsed time Ta is equal to or greater than the variable Da, terminates the retention of the data point.

In step 105, the flowchart returns to step 101 unless the process is terminated, for example, due to the termination of the game application.

Determination of a weighted speed made by the engine unit 23 will now be described. For a method of determining the weighted speed by means of the engine unit 23, it is possible to employ a method similar to the method of determining a weighted speed by means of the engine unit, as described in the Publication of Japanese Patent No. 6560801.

The engine unit 23 retains, in a second buffer in the storage device 14 at intervals of the frame time, a data point sequence composed of one or more data points retained in the first buffer. Alternatively, without the intervention of the first buffer, the engine unit 23 retains, in the second buffer at intervals of the frame time, a data point sequence composed of one or more data points acquired on the basis of touch events generated by a user operation on the touchscreen 12.

A data point sequence P(i) retained by the engine unit 23 in the i-th frame is expressed as follows.

$$P(i) = \{P_{i,1}, P_{i,2}, \ldots P_{i,m}\}$$

Here, $P_{i,k}$ (k=1 to m) represents individual data points. The individual data points included in the data point sequence P(i) are the data points retained in the first buffer in the time period of the i-th frame. The value of the x coordinate and the value of the y coordinate of each of the data points (k=1 to m) are expressed by $(x_{i,k}, y_{i,k})$. It is assumed that the individual data points are stored in the first buffer in chronological order, i.e., $P_{i,1}, P_{i,2}, \ldots, P_{i,m}$. The engine unit 23 retains P(i) one frame time F (seconds) after the retention of the (i−1)-th P(i−1), and retains P(i+1) after the elapse of another frame time. The value of the variable m, which signifies the number of data points included in P(i), varies depending on P(i).

Among the data point sequences retained in the second buffer, the engine unit 23 terminates the retention of the data point sequences for which a predetermined retention time period has expired. For example, when terminating the retention of the data of a data point sequence, the engine unit 23 may delete the data or invalidate the data, or alternatively, delete the data, as appropriate, by associating, with the data, a flag indicating that the retention of the data point sequence has been terminated. In an example, the engine unit 23 defines a variable Db specifying the life of each of the data points stored in the second buffer. The time period specified by the variable Db corresponds to the predetermined retention time period, and corresponds to the time period of the frame in this embodiment. For example, the engine unit 23 retains the data point sequence P(i) in the second buffer in association with a time $t_i$ at which the data point sequence P(i) was retained. After storing one data point sequence P(i) in the second buffer, the engine unit 23 monitors an elapsed time Tb, which is a time elapsed since the storage of the data point sequence P(i), and continuously compares the elapsed time Tb with the variable Db. For example, the engine unit 23 calculates the elapsed time Tb by using the time $t_i$ of retention. The engine unit 23 terminates retention of the data point sequence P(i) in the second buffer when the elapsed time Tb of the data point sequence P(i) being monitored exceeds the variable Db.

In this embodiment, the engine unit 23 retains one data point sequence P(i) in the second buffer for a time period of 5F (seconds) corresponding to five frames. Thus, the engine unit 23 retains five data point sequences. The engine unit 23 retains the five data point sequences such that the order of the data point sequences is P(5), P(4), P(3), P(2), and P(1) from the latest to the earliest. Accordingly, in the case where the engine unit 23 retains data point sequences corresponding to five frames, the latest retained data point sequence is P(5). In the case where a data point sequence is to be newly retained, the engine unit 23 retains the new data point sequence as P(5), and substitutes the data of P(i+1) for P(i) (1≤i≤4). At this time, the engine unit 23 terminates the retention of P(1) for which the predetermined retention time period has expired.

A data point sequence can represent a sequence of data points or represent a matrix of data points. In a preferred example, the engine unit 23 retains the x coordinate value and the y coordinate value separately from each other as data point sequences at intervals of the frame time. A set X of x coordinate values and a set Y of y coordinate values retained by the engine unit 23 are expressed by expressions (1) and (2), respectively.

$$X = \begin{bmatrix} x_{1,1} & \cdots & x_{n,1} \\ \vdots & \ddots & \vdots \\ x_{1,m} & \cdots & x_{n,m} \end{bmatrix} \quad (1)$$

$$Y = \begin{bmatrix} y_{1,1} & \cdots & y_{n,1} \\ \vdots & \ddots & \vdots \\ y_{1,m} & \cdots & y_{n,m} \end{bmatrix} \quad (2)$$

Here, n signifies the number of data point sequences retained in the second buffer by the engine unit 23, and corresponds to the number of frames. In this embodiment, because the engine unit 23 retains data point sequences for a time period of 5F (seconds) corresponding to five frames, n=1, n=2, n=3, n=4, n=5, n=5, . . . , n=5 as time elapses. Accordingly, n=5 after the elapse of the time period of 5F (seconds) corresponding to five frames. Furthermore, the x coordinate values of the latest retained data point sequence P(n) are $x_{n,1}, \ldots x_{n,m}$, and the y coordinate values of the latest retained data point sequence P(n) are $y_{n,1}, \ldots y_{n,m}$. Note that the maximum value of n varies depending on the time period for which the engine unit 23 retains the data point sequences.

The engine unit 23 determines, at intervals of the frame time, a displacement speed in a data point sequence retained in the second buffer on the basis of the displacement of the data points in that data point sequence. The engine unit 23 determines a weighted speed on the basis of at least a bias (deviation) of the latest determined displacement speed relative to the average of the previously determined displacement speeds. In an example, the engine unit 23 retains the value of the determined weighted speed in a predetermined storage area in the storage device 14 that can be referred to by other functional units and programs.

The displacement speed corresponds to the speed at which a data point (position at which a touch event is generated) is displaced in the time period of the relevant frame. In other words, the displacement speed can be defined as a speed corresponding to the movement speed of a finger of the user as calculated from a set of data points (positions at which touch events are generated) in the time period of the relevant frame. A displacement speed $v_i$ signifies the displacement speed in the i-th data point sequence or the displacement speed in the i-th frame.

In an example, the engine unit 23 determines a weighted speed on the basis of a bias of a displacement speed $v_n$ in the latest data point sequence among the retained data point sequences relative to the average of displacement speeds $v_1$ to $v_{n-1}$ in the data point sequences retained earlier than the latest data point sequence. In an example, the engine unit 23 determines a weighted speed on the basis of a bias of a displacement speed $v_i$ (i=1 to n) in one data point sequence among the retained data point sequences relative to the average of displacement speeds $v_1$ to $v_{i-1}$ in the data point sequences retained earlier than the one data point sequence. Here, the bias of the displacement speed $v_i$ relative to the average of the displacement speeds $v_0$ to $v_{i-1}$ is, for example, a bias (deviation) of the displacement speed $v_i$ from the average of the displacement speeds $v_0$ to $v_{i-1}$. Note that the average of the displacement speeds $v_1$ to $v_{i-1}$ is 0 in the case where i=1 and $v_1$ in the case where i=2.

In an example, the engine unit 23 calculates an output value of the Cumulative Pointwize Deviation function (CPD function) defined by expression (3) and determines the output value as the weighted speed.

$$CPD(x, y) = \sqrt{\frac{1}{n}\sum_{i=1}^{n}(v_i - avg_{i-1}(V))^2} \quad (3)$$

Here, n signifies the number of data point sequences retained in the second buffer by the engine unit 23.

In an example, in the case where the engine unit 23 retains x coordinate values and y coordinate values separately from each other as data point sequences, the engine unit 23 determines a displacement speed on the basis of the displacement of the x coordinate values and the displacement of the y coordinate values in a data point sequence retained in the second buffer. In an example, the engine unit 23 determines a displacement speed on the basis of the amount of displacement between time-sequentially neighboring data points in a data point sequence retained in the second buffer and the number of data points included in that data point sequence.

In an example, a displacement speed is calculated according to expression (4).

$$v_i = \frac{\alpha}{m-1}\sum_{j=1}^{m-1}\left(\beta\sqrt{(x_{i,j} - x_{i,j+1})^2 + (y_{i,j} - y_{i,j+1})^2}\right) \quad (4)$$

Here, α represents a coefficient corresponding to the pixel density DPI (dots per inch) of the display. α signifies a real value equal to or greater than 0, which is usually 1. β signifies an integration weight. Increasing β makes the displacement speed more likely to reflect abrupt changes, and decreasing β makes the displacement speed less likely to reflect abrupt changes. In the case where P(i) includes no data points, the engine unit 23 does not calculate the displacement speed $v_i$, and sets, for example, $v_i$=0. Also, in the case where P(i) includes only one data point, the engine unit 23 does not calculate the displacement speed $v_i$, and sets, for example, $v_i$=0.

$avg_{i-1}(v)$ signifies the average of the displacement speeds $v_i$ up to immediately before the i-th frame. $avg_{i-1}(v)$ is calculated according to expression (5).

$$avg_{i-2}(V) = \begin{cases} \frac{1}{i-1}\sum_{j=1}^{i-1}v_j, & i-1 > 0 \\ 0, & i-1 = 0 \end{cases} \quad (5)$$

Here, in the case where i=1, because there is no displacement speed up to immediately before, $avg_{i-1}(v)$=0.

Figure 5:
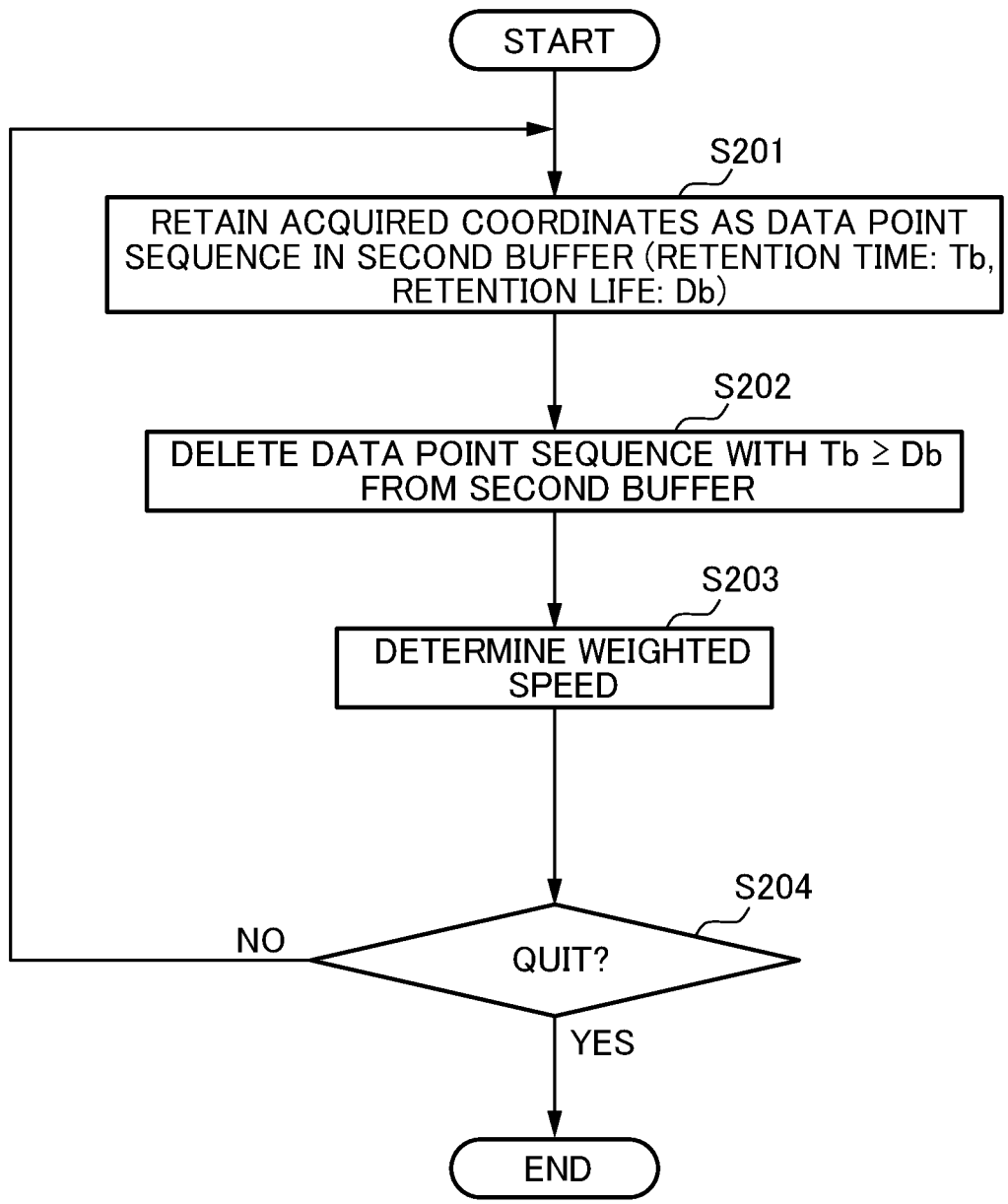
FIG. 5 is a flowchart for illustrating processing concerning determination of a weighted speed, which is executed in the electronic device according to an embodiment of the present invention.

FIG. 5 is a flowchart for illustrating processing concerning determination of a weighted speed, which is executed in the electronic device 10 according to an embodiment of the present invention. In an example, the electronic device 10 executes steps 201 to 204 of this flowchart at intervals of the time period corresponding to the frame rate.

In step 201, the engine unit 23 retains, in the second buffer, data points acquired in the time period of one frame as a data point sequence P(i). At this time, the engine unit 23 associates Tb and Db with the data point sequence P(i) to be retained, where Tb indicates the elapsed time in milliseconds after the storage of the data point sequence and Db is a variable indicating a time (retention life) in milliseconds for which the data point sequence can be stored in the second buffer.

Then, in step 202, among the data point sequences P(i) retained in the second buffer, the engine unit 23 terminates the retention of data point sequences P(i) for which the elapsed time Tb is equal to or greater than the variable Db.

Subsequently, in step 203, the engine unit 23 determines a weighted speed by using expressions (3) to (5).

Subsequently, in step 204, the flowchart returns to step 201 unless the process is terminated, for example, due to the termination of the game application. When the flowchart ends, the engine unit 23 terminates the retention of all the data point sequences P(i).

Angle determination made by the engine unit 23 will now be described. For a method of determining the angle by means of the engine unit 23, it is possible to employ a method similar to the method of determining an angle by means of an angle determination unit, as described in Publication of Japanese Patent No. 6389581.

The engine unit 23 determines whether or not an angle can be calculated at intervals of the frame time. If an angle can be calculated, the engine unit 23 uses the data points retained in the first buffer and determines an angle indicated by the set of data points. By determining an angle indicated by the set of data points, the engine unit 23 becomes capable of determining the angle in the direction intended by the user who performed a touch operation on the touchscreen 12. In an example, the engine unit 23 defines a variable B and, if the number of data points retained in the first buffer is equal to or greater than the variable B, calculates (determines) an angle using the data points and retains the determined angle. In this case, the engine unit 23 retains only the latest determined angle. If the number of data points retained in the first buffer is less than the variable B, the engine unit 23 determines the angle being retained, without calculating an angle. In general, in determining the slope of a regression line, it is desirable to have three or more data points, and the variable B is thus preferably set to 3 or more.

The engine unit 23 determines the slope of the regression line on the basis of the data points retained in the first buffer. In determining the slope of the regression line, the engine unit 23 sets one of the x-axis and the y-axis as the axis for the independent variable on the basis of the amount of displacement of the x-axis values and the amount of displacement of the y-axis values in the data points retained in the first buffer. The engine unit 23 sets the other axis as the axis for the dependent variable. In an example, the engine unit 23 calculates the slope of the regression line using the least squares method.

The engine unit 23 determines a slope a of the regression line, y=ax+b, when the axis for the independent variable is the x-axis and determines a slope c of the regression line, x=cy+d, when the axis for the independent variable is the y-axis.

In an example, the engine unit 23 sets one of the x-axis and the y-axis as the axis for the independent variable and sets the other as the axis for the dependent variable on the basis of the difference between the maximum and the minimum of the values on the x-axis and the difference between the maximum and the minimum of the values on the y-axis in the data points retained in the first buffer. In an example, the engine unit 23 sets one of the x-axis and the y-axis as the axis for the independent variable and sets the other as the axis for the dependent variable on the basis of a value obtained by weighting, with a weight coefficient, the difference between the maximum and the minimum of the values on the x-axis, as well as on the basis of the difference between the maximum and the minimum of the values on the y-axis, in the data points retained in the first buffer.

Because the slope of the regression line to be calculated does not have a positive or negative direction, the engine unit 23, when calculating the slope of the regression line using the least-squares method, calculates the angle, for example, within the ranges of 0-90 degrees and 270-360 degrees. Thus, even when the angle indicated by the set of data points is, for example, 45 degrees or 225 degrees, 45 degrees is calculated as the slope of the regression line. For this reason, after determining the slope of the regression line, the engine unit 23 determines, on the basis of a displacement direction taken as the set of data points, the amount of rotation indicating whether or not to rotate the regression line by 180 degrees relative to the determined slope (angle) of the regression line. In an example, the engine unit 23 determines the amount of rotation by comparing the number of positive differences with the number of negative differences between time-sequentially preceding and following values on the set axis for the independent variable in the data points. Here, the displacement direction taken as the set of data points indicates the direction in which the data points are displaced over time and corresponds to, for example, a rough direction in which the user moves his/her finger on the touchscreen 12.

In an example, the engine unit 23 uses the function aop(x,y) shown in expression (6) to determine the angle. The function aop(x,y) calculates an angle as a real number from 0 to 360 degrees. It is assumed that when the engine unit 23 calculates an angle using the function aop(x,y), the first buffer retains n data points P. The value of the x-coordinate and the value of the y-coordinate of each of the n data points $P_k$ (k=1 to n) is represented as ($x_k$, $y_k$), and it is assumed that the individual data points $P_k$ are stored in the first buffer in chronological order from $P_1$, $P_2$, ..., $P_n$.

The function rotate(x,y) determines whether or not the n data points P are displaced primarily in the y-axis direction and returns, for example, a true or false value. In this way, the function rotate(x,y) determines whether the n data points P are displaced mainly in the x-axis (left/right) direction or mainly in the y-axis (up/down) direction, and determines which of the values on the x-axis and the values on the y-axis is appropriate as an independent variable.

In expression (7), (max(x)−(min(x)) is the absolute value of the difference between the maximum and the minimum of the values of x ($x_1$, $x_2$, ... $x_n$) in the n data points P, indicating the amount of displacement of the n data points P in the x-axis direction. Likewise, (max(y)−min(y)) is the absolute value of the difference between the maximum and the minimum of the values of y ($y_1$, $y_2$, ... $y_n$) in the n data points P, indicating the amount of displacement of the n data points P in the y-axis direction. A variable w is a weight coefficient for weighting (max (x)−min(x)).

When (max(y)−min(y)) is greater than the product of (max(x)−min(x)) and the variable w, the function rotate(x,y) satisfies the inequality, and the function aop(x,y) performs coordinate transformation, accordingly. In this case, the function aop(x,y) determines the amount of rotation by setting the y-axis as the axis for the independent variable, by setting the x-axis as the axis for the dependent variable, and further by using the function down(y). On the other hand, when (max(y)−min(y)) is smaller than or equal to the product of (max(x)−min(x)) and the variable w, the function rotate(x,y) does not satisfy the inequality, and the function aop(x,y) does not perform coordinate transformation, accordingly. In this case, the function aop(x,y) determines the amount of rotation by setting the x-axis as the axis for the independent variable, by setting the y-axis as the axis for the dependent variable, and further by using the function left(x). The variable w is set to, for example, 0.5 or 2, depending on the dimensions in the x- and y-axis directions, the way the user holds the smartphone, etc.

The function left(x) is represented by expression (8).

$$\text{left}(x) = |\{x'_i > 0\}| < |\{x'_i < 0\}|, \; x' \leftarrow [x_2-x_1, x_3-x_2, \ldots, x_n-x_{n-1}] \quad (8)$$

$$aop(x, y) = \begin{cases} 180 \dfrac{\text{atan}\left(\dfrac{\sum_{i=1}^n (x_i-\bar{x})(y_i-\bar{y})}{\sum_{i=1}^n (x_i-\bar{x})^2}\right)}{\pi}, & \neg \text{rotate}(x,y) \wedge \neg \text{left}(x) \\[2ex] -180 \dfrac{\text{atan}\left(\dfrac{\sum_{i=1}^n (x_i-\bar{x})(y_i-\bar{y})}{\sum_{i=1}^n (y_i-\bar{y})^2}\right)}{\pi} + 90, & \text{rotate}(x,y) \wedge \neg \text{down}(y) \\[2ex] -180 \dfrac{\text{atan}\left(\dfrac{\sum_{i=1}^n (x_i-\bar{x})(y_i-\bar{y})}{\sum_{i=1}^n (y_i-\bar{y})^2}\right)}{\pi} + 270, & \text{rotate}(x,y) \wedge \text{down}(y) \\[2ex] 180 \dfrac{\text{atan}\left(\dfrac{\sum_{i=1}^n (x_i-\bar{x})(y_i-\bar{y})}{\sum_{i=1}^n (x_i-\bar{x})^2}\right)}{\pi} - 180, & \neg \text{rotate}(x,y) \wedge \text{left}(x) \end{cases} \quad (6)$$

For the function aop(x,y), the function rotate(x,y), the function left(x), and the function down(y) are used for case-by-case processes. First, the function aop(x,y) uses the function rotate(x, y) to set one of x and y as an independent variable.

The function rotate(x,y) is defined by expression (7).

$$\text{rotate}(x,y) = w \cdot (\max(x) - \min(x)) < (\max(y) - \min(y)) \quad (7)$$

If the function rotate(x,y) does not satisfy the inequality, the function left(x) determines whether or not the displacement direction of the n data points P is in the −x axis direction (left direction), and returns, for example, a true or false value. The function left(x) calculates the differences ($x_2-x_1$, $x_3-x_2$, ... $x_n-x_{n-1}$) between time-sequentially preceding and following values among the values of x ($x_1, x_2, \ldots x_n$) in the n data points P. The function left(x) determines whether or not the displacement direction of the n data points P is in the −x axis direction (left direction) by determining whether or not the number of negative differences is greater than the number of positive differences. In this way, the function left(x) determines whether the displacement direction of the n data points P is in the −x-axis direction (left direction) or in the +x-axis direction (right direction) and determines the amount of rotation that indicates whether or not to rotate the regression line by 180 degrees relative to the determined slope of the regression line. For example, if the function left(x) is true, the function aop(x,y) determines that the amount of rotation is 180 degrees, and if the function left(x) is false, the function aop(x,y) determines that the amount of rotation is 0 degrees.

The function down(y) is represented by expression (9).

$$\text{down}(y) = |\{y'_i > 0\}| < |\{y'_i < 0\}|, \ y' \leftarrow [y_2 - y_1, y_3 - y_2, \ldots, y_n - y_{n-1}] \quad (9)$$

If the function rotate(x,y) satisfies the inequality, the function down(y) determines whether or not the displacement direction of the n data points P is in the −y axis direction (down direction) and returns, for example, a true or false value. The function down(y) calculates the differences ($y_2-y_1, y_3-y_2, \ldots y_n-y_{n-1}$) between time-sequentially preceding and following values among the values of y ($y_1, y_2, \ldots y_n$) in the n data points P. The function down(y) determines whether or not the displacement direction of the n data points P is in the −y axis direction (down direction) by determining whether or not the number of negative differences is greater than the number of positive differences. In this way, the function down(y) determines whether the displacement direction of the n data points P is in the −y-axis direction (down direction) or in the +y-axis direction (up direction) and determines the amount of rotation that indicates whether or not to rotate the regression line by 180 degrees relative to the determined slope of the regression line. For example, if the function down(y) is true, the function aop(x,y) determines that the amount of rotation is 180 degrees, and if the function down(y) is false, the function aop(x,y) determines that the amount of rotation is 0 degrees.

After determining the independent variable (axis for the independent variable) and the amount of rotation as described above, the function aop(x,y) calculates the slope using the least squares method. For example, if x is the independent variable and y is the dependent variable, the function aop(x,y) calculates the slope a of the regression line, y=ax+b, using expression (10).

$$a = \frac{\sum_{i=1}^{n}(x_i - \bar{x})(y_i - \bar{y})}{\sum_{i=1}^{n}(x_i - \bar{x})^2} \quad (10)$$

Here, $\bar{x}$ is the average of x (independent variable), $\bar{y}$ is the average of y (dependent variable), $$n \sum_{i=1}^{n}(x_i - \bar{x})(y_i - \bar{y})$$

is the covariance of x (independent variable) and y (dependent variable), and $$\sum_{i=1}^{n}(x_i - \bar{x})^2$$

is the dispersion of x (independent variable).

If y is the independent variable and x is the dependent variable, the function aop(x,y) calculates the slope c of the regression line, x=cy+d, using expression (11) in the same manner.

$$c = \frac{\sum_{i=1}^{n}(x_i - \bar{x})(y_i - \bar{y})}{\sum_{i=1}^{n}(y_i - \bar{y})^2} \quad (11)$$

If the function rotate(x,y) is false and the function left(x) is false, the function aop(x,y) calculates the angle obtained from the slope of the regression line as is. If the function rotate(x,y) is false and the function left(x) is true, the function aop(x,y) calculates an angle by adding 180 degrees to the angle obtained from the slope of the regression line. If the function rotate(x,y) is true and the function down(y) is false, the function aop(x,y) calculates an angle by subtracting the angle obtained from the slope of the regression line from 90 degrees. If the function rotate(x,y) is true and the function down(y) is true, the function aop(x,y) calculates an angle by adding 180 degrees to the angle calculated by subtracting the angle obtained from the slope of the regression line from 90 degrees.

In an example, the engine unit 23 retains the value of the determined angle in a predetermined storage area in the storage device 14 that can be referred to by other functional units and programs, unless touchend or touchcancel is generated. In this embodiment, the engine unit 23 retains only the latest determined angle.

Figure 6:
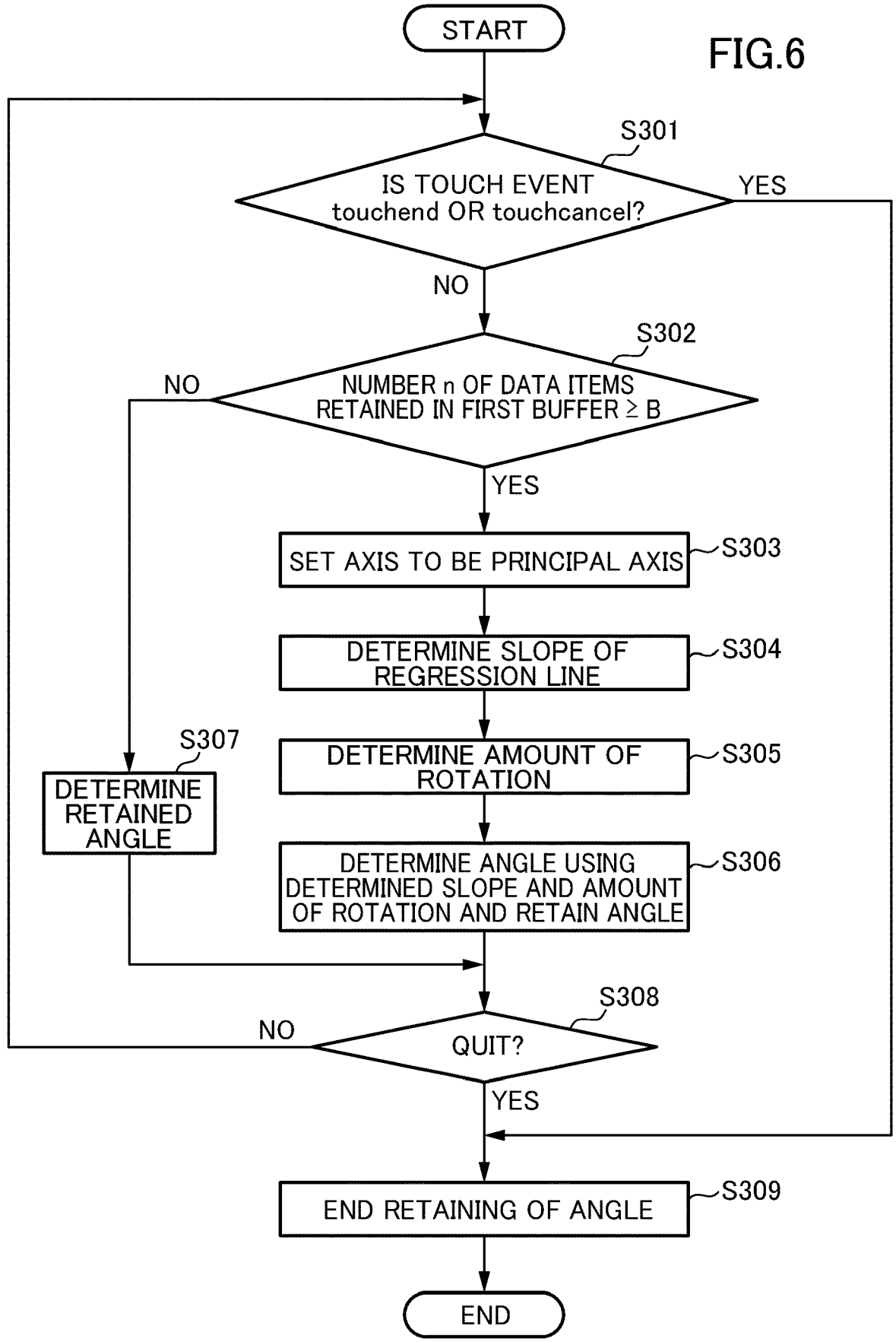
FIG. 6 is a flowchart for illustrating processing concerning determination of an angle, which is executed in the electronic device according to an embodiment of the present invention.

FIG. 6 is a flowchart for illustrating processing concerning determination of an angle, which is executed in the electronic device 10 according to an embodiment of the present invention. In an example, the electronic device 10 executes steps 301-309 of this flowchart at intervals of the frame time corresponding to the frame rate.

In step 301, the engine unit 23 determines whether or not a touchend event or a touchcancel event has been generated. In an example, the engine unit 23 determines whether or not such a touch event has been generated in the time period of one frame. When a touchend or touchcancel event has not been generated, this flowchart proceeds to step 302. If a touchend or touchcancel event has been generated, this flowchart proceeds to step 309.

In step 302, the engine unit 23 determines whether or not the number n of data points retained in the first buffer is equal to or greater than the value of the variable B. If the number n is equal to or greater than the variable B, this flowchart proceeds to step 303, and if the number n is less than the variable B, the flowchart proceeds to step 307.

Subsequently, in step 303, the engine unit 23 sets one of the x-axis and the y-axis as the axis for the independent variable on the basis of the amount of displacement of the x-axis values and the amount of displacement of the y-axis values in the data points retained in the first buffer. At the same time, the engine unit 23 sets the other axis as the axis for the dependent variable.

Then, in step 304, if the x-axis is set as the axis for the independent variable, the engine unit 23 determines the angle of the slope of the regression line by calculating the angle of the slope using expression (10). If the y-axis is set as the axis for the independent variable in step 303, the engine unit 23 determines the angle of the slope of the regression line by calculating the angle of the slope using expression (11) and then subtracting the calculated angle from 90 degrees. In an example, when the engine unit 23 calculates the angle of the slope by using expression (10) or expression (11), the engine unit 23 calculates the angle within the ranges of 0-90 degrees and 270-360 degrees.

Subsequently, in step 305, the engine unit 23 determines, on the basis of a displacement direction taken as the set of data points retained in the first buffer, the amount of rotation that indicates whether or not to rotate the regression line by 180 degrees relative to the determined slope of the regression line. In an example, if the x axis is set as the axis for the independent variable in step 108, the engine unit 23 calculates the difference between every pair of time-sequentially preceding and following values on the x axis. When the number of calculated negative differences is greater than the number of calculated positive differences, the engine unit 23 determines that the amount of rotation is 180 degrees. When the number of calculated negative differences is less than the number of calculated positive differences, the engine unit 23 determines that the amount of rotation is 0 degrees. In an example, if the y axis is set as the axis for the independent variable in step 108, the engine unit 23 calculates the difference between every pair of time-sequentially preceding and following values on the y axis. When the number of calculated negative differences is greater than the number of calculated positive differences, the engine unit 23 determines that the amount of rotation is 180 degrees. When the number of calculated negative differences is less than the number of calculated positive differences, the engine unit 23 determines that the amount of rotation is 0 degrees.

Then, in step 306, the engine unit 23 determines an angle on the basis of the determined slope of the regression line and the determined amount of rotation and retains the determined angle. In an example, the engine unit 23 determines an angle by adding the determined amount of rotation to the angle corresponding to the determined slope of the regression line. If the amount of rotation is 0 degrees, the angle determined by the engine unit 23 is the angle corresponding to the determined slope of the regression line. This flowchart proceeds to step 308.

In step 307, the engine unit 23 determines (outputs) the retained angle. If there is no retained angle, the engine unit 23 determines (outputs) data indicating that the angle is not retained, such as NULL.

In step 308, the flowchart proceeds to step 309 if the process is terminated, for example, due to the termination of the game application and otherwise returns to step 301. In step 309, the engine unit 23 terminates the retention of the angle.

The controller control unit 24 determines a converted weighted speed at intervals of the frame time by inputting the determined weighted speed into a predetermined function. The predetermined function is a function that determines values corresponding to input values and that retains and determines (outputs) the maximum of the determined values. The converted weighted speed determined by the controller control unit 24 is a weighted speed for determining parameters such as the moving direction and speed of the operated character. In an example, the controller control unit 24 inputs the determined weighted speed into the predetermined function at intervals of the frame time. The predetermined function determines, at intervals of the frame time, a value corresponding to the input value and outputs and retains the greater of the determined value and the greatest of the values determined so far by the predetermined function. For example, the predetermined function retains the value output in the i-th frame, and in the (i+1)-th frame, uses the retained value as the maximum value among the values determined so far by the predetermined function. In an example, the controller control unit 24 retains the value of the determined converted weighted speed in a predetermined storage area in the storage device 14 that can be referred to by other functional units and programs, unless touchend or touchcancel is generated.

In an example, the predetermined function is an activation function f(s,p) defined by expression (12) that uses the function max{A, B} for outputting the maximum value of A and B. The controller control unit 24 determines that the output value of the activation function f(s,p) is the converted weighted speed.

$$f(s, p) = \max\{o(=s/C), p\} \quad (12)$$
$$= \begin{cases} p, s/C < p \\ s/C, s/C \geq p \end{cases}$$

Here, s is the latest determined output value (weighted speed) of the CPD function, and p is the value that was output and retained immediately before by the activation function f(s,p). The value that was output immediately before means the value that was determined and output from the activation function f(s,p) in the frame preceding the frame in which the controller control unit 24 is to determine an output value (converted weighted speed) of the activation function f(s,p). The activation function f(s,p) takes s as an input, determines a real number o between 0 and 1, compares o with p, and outputs o if o is equal to or greater than p or outputs p if o is less than p. Therefore, the output value of the activation function f(s,p) will not be less than p. In this embodiment, the real number o is the value obtained by dividing the output value s of the CPD function by a predetermined constant C. For example, the predetermined constant C is set to the maximum value that can be taken by the output value of the CPD function, so that the real number o is a real number between 0 and 1. The range from 0 to 1 of the real number o determined by the activation function f(s,p) can be any other numerical range.

Figure 7:
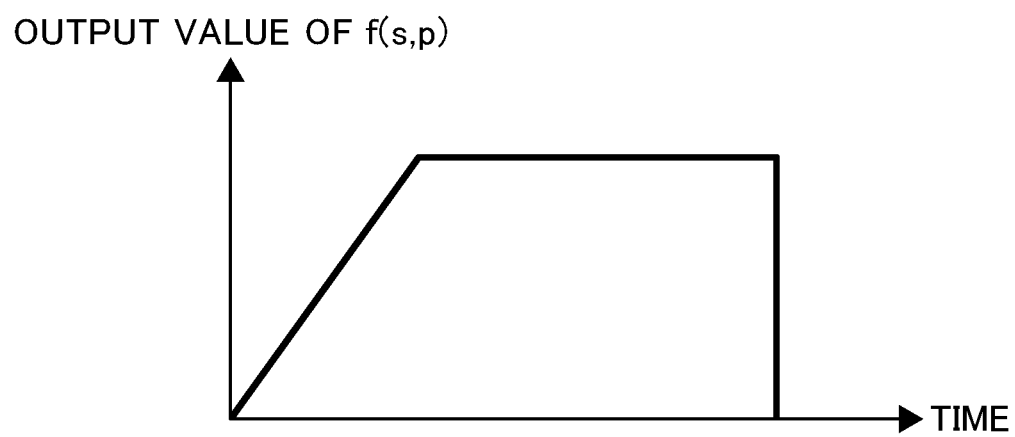
FIG. 7 shows an example of an output value of an activation function $f(s,p)$.

Because the CPD function continuously calculates values on a frame by frame basis, its output values vary discontinuously in response to discontinuous movements of the user's finger, thus often fluctuating significantly. FIG. 7 shows an example of an output value of the activation function f(s,p). The output value of the activation function f(s,p) changes continuously, going up but not down over time. Thus, the activation function f(s,p) converts the value of the CPD function into a stable output value. When a user operation on the touchscreen 12 generates a touch end (touchend) event or a touch cancel (touchcancel) event, the activation function f(s,p) terminates the retention of p and outputs zero or NULL as an output value.

Figure 8:
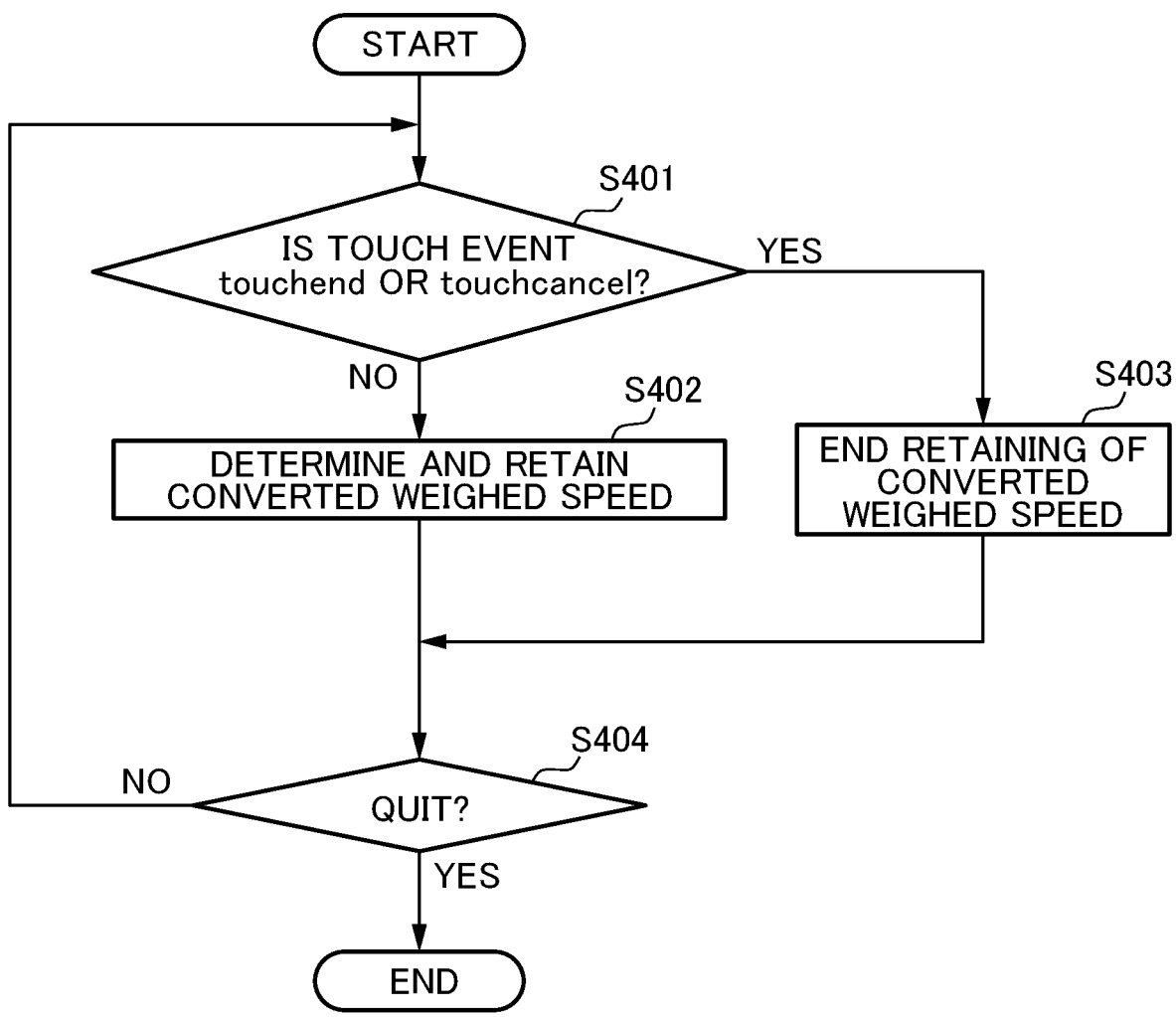
FIG. 8 is a flowchart for illustrating processing concerning determination of a converted weighted speed, which is executed in the electronic device according to an embodiment of the present invention.

FIG. 8 is a flowchart for illustrating processing concerning determination of a converted weighted speed, which is executed in the electronic device 10 according to an embodiment of the present invention. In an example, the electronic device 10 executes steps 401-404 of this flowchart at intervals of the frame time corresponding to the frame rate.

In step 401, the controller control unit 24 determines whether or not a touchend event or a touchcancel event has been generated. In an example, the controller control unit 24 determines whether or not such a touch event has been generated in the time period of one frame. If a touchend or touchcancel event has not been generated, this flowchart proceeds to step 402 and then proceeds to step 404. If a touchend or touchcancel event has been generated, this flowchart proceeds to step 403 and then proceeds to step 404.

In step 402, the controller control unit 24 determines a converted weighted speed by using expression (12). At this time, the controller control unit 24 retains the determined converted weighted speed in a predetermined storage area in the storage device 14. This converted weighted speed that is retained is the value referred to as p when the controller control unit 24 uses expression (12) for processing in the next round of step 402. In an example, in step 402 executed at intervals of the time period corresponding to the frame rate, the controller control unit 24 determines the converted weighted speed by using expression (12) and the latest weighted speed determined in step 203, which is also executed at intervals of the time period corresponding to the frame rate.

In step 403, the controller control unit 24 terminates the retention of the converted weighted speed.

In step 404, the flowchart returns to step 401 unless the process is terminated, for example, due to the termination of the game application. When this flowchart ends, the controller control unit 24 terminates the retention of the converted weighted speed.

The controller control unit 24 generates, at intervals of the frame time, a composite vector by using the angle determined by the engine unit 23 and the converted weighted speed determined by the controller control unit 24. In an example, the controller control unit 24 generates a composite vector on the basis of the value of the converted weighted speed retained in the predetermined storage area and a unit vector having the value of the angle retained in the predetermined storage area. The controller control unit 24 retains the data of the calculated composite vector in the predetermined storage area.

In an example, the controller control unit 24 calculates a composite vector compose(v) using expression (13).

$$\text{compose}(\vec{V}) = \begin{cases} (\vec{V_h} + \vec{V_a})/|\vec{V_h} + \vec{V_a}|, & |\vec{V_h} + \vec{V_a}| > 1.0 \\ \vec{V_h} + \vec{V_a}, & |\vec{V_h} + \vec{V_a}| \le 1.0 \end{cases} \quad (13)$$

$$\vec{V_a} = f(s, p) * \vec{e}/\gamma$$

Here, $\vec{V_h}$ is a composite vector that was determined and retained immediately before by the controller control unit 24, $\vec{V_a}$ is an additive vector to be added to the composite vector retained by the controller control unit 24, f(s,p) is the latest converted weighted speed determined by the engine unit 23, $\vec{e}$ is a unit vector having the angle determined by the engine unit 23, and y is a weight for the additive vector. Note that the composite vector that was determined and retained immediately before is the composite vector that was determined and retained in the frame preceding the frame in which the controller control unit 24 is to determine a composite vector. As shown by expression (13), the composite vector $\vec{V_h} + \vec{V_a}$ is normalized so as not to have a maximum value greater than 1.0. Note that setting the maximum value of the composite vector to 1.0 is merely an example, and the maximum value of the composite vector can be set to another numerical value.

Figure 9:
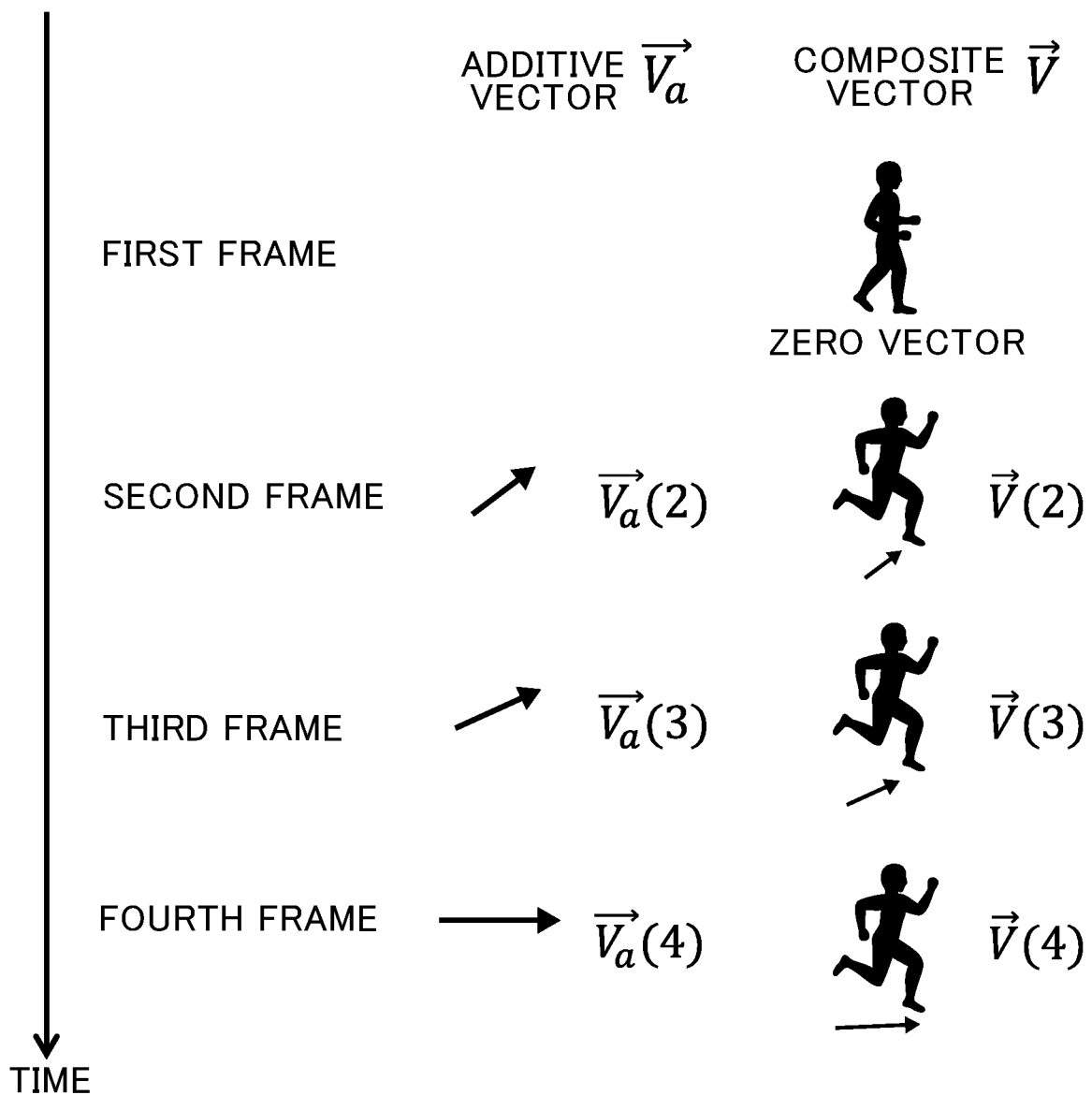
FIG. 9 is an example showing generation of a composite vector performed by a controller control unit.

FIG. 9 is an example showing the generation of a composite vector performed by the controller control unit 24. For the first frame, it is assumed that the additive vector is a zero vector and the vector retained by the controller control unit 24 is also a zero vector. In this case, the composite vector is also a zero vector. The additive vector is a zero vector mainly when the engine unit 23 does not acquire and retain any data points, i.e., when no touch events have been generated. Hereinafter, the additive vector and the composite vector in the i-th frame are represented respectively as follows.

$\vec{V_a}(i), \vec{V}(i)$

For the second frame, it is assumed that the additive vector is not a zero vector. In this case, the vector retained by the controller control unit 24 is a zero vector, and hence the composite vector is as follows.

$\vec{V}(2) = \vec{V_a}(2)$

This indicates that the additive vector serves as a composite vector as is.

For the third frame, it is assumed that an additive vector is further added. In this case, the vector retained by the controller control unit 24 is as follows.

$\vec{V}(2)$

Therefore, the composite vector is as follows.

$\vec{V}(3) = \vec{V}(2) + \vec{V_a}(3)$

This is a vector resulting from addition of the vector retained by the controller control unit 24 and the additive vector.

For the fourth frame, it is assumed that an additive vector is further added and the size (norm) of the composite vector exceeds 1. In this case, the composite vector is as follows.

$\vec{V}(4) = (\vec{V}(3) + \vec{V_a}(4))/|\vec{V}(3) + \vec{V_a}(4)|$

This constitutes a vector that results from addition of the vector retained by the controller control unit 24 and the additive vector and that has a norm of 1.

In this embodiment, the engine unit 23 determines the angle and weighted speed at intervals of the frame time, and the controller control unit 24 determines the converted weighted speed at intervals of the frame time. In this way, the controller control unit 24 is configured to be capable of generating a composite vector in each frame.

The direction (angle) and the magnitude of the composite vector determined by the controller control unit 24 correspond to an input of the direction and the magnitude of the virtual controller. The converted weighted speed determined by the controller control unit 24 corresponds to the magnitude of an additive vector for generating a composite vector and constitutes a value contributing to an input of the magnitude of the virtual controller. The converted weighted speed determined by the controller control unit 24 corresponds to the direction of an additive vector for generating a composite vector and constitutes a value contributing to an input of the direction of the virtual controller. In this embodiment, however, the concept of a virtual controller is not essential, and any concept is acceptable if the controller control unit 24 is allowed to generate (determine) a composite vector in each frame and to pass the determined composite vector to the application unit 25.

The application unit 25 corresponds to a specific game application that implements actions, etc. in the game. For example, the application unit 25 is a function implemented in the game application installed in the electronic device 10. In this game application, similarly to game applications in general, the main loop of the main program is processed at intervals of the time period corresponding to, for example, the frame rate. Alternatively, the application unit 25 may be configured to correspond to an input support application or a simulation application that causes the operated object to act in response to a user operation.

Figure 10:
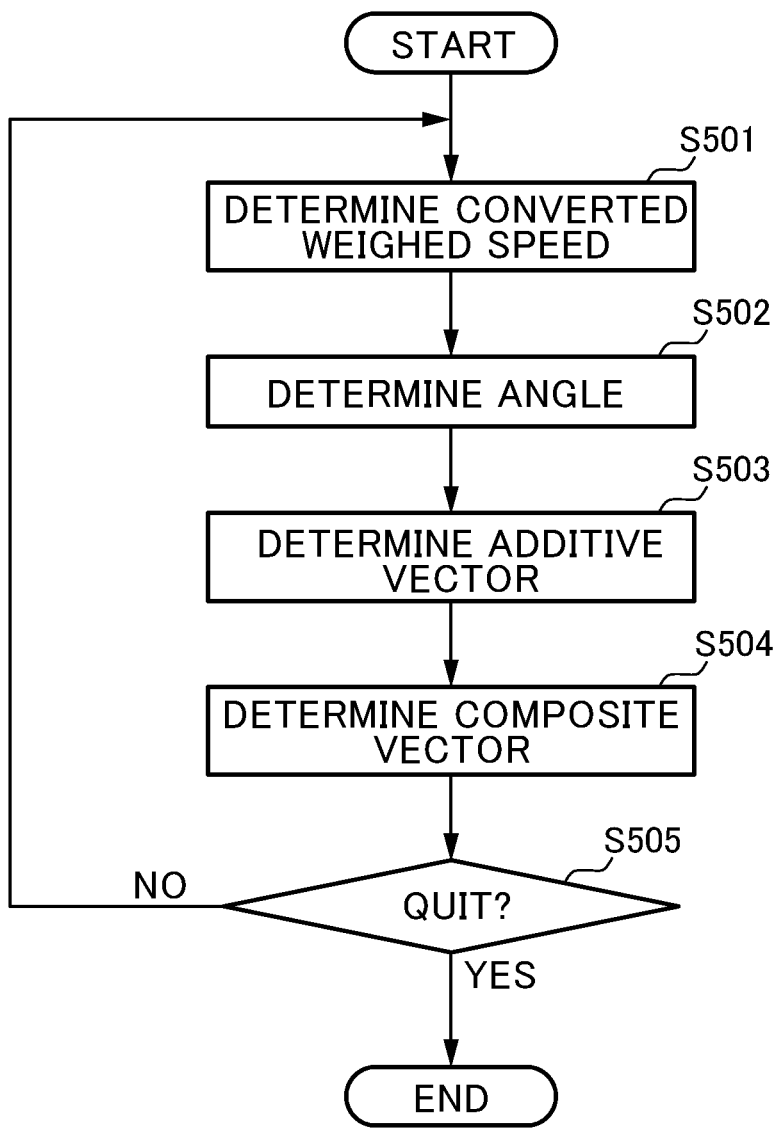
FIG. 10 is a flowchart for illustrating processing concerning determination of a composite vector, which is executed in the electronic device according to an embodiment of the present invention.

FIG. 10 is a flowchart for illustrating processing concerning determination of a composite vector, which is executed in the electronic device 10 according to an embodiment of the present invention. In an example, the electronic device 10 executes steps 501 to 505 of this flowchart at intervals of the time period corresponding to the frame rate.

Step 501 is a step corresponding to step 402, and the engine unit 23 determines a converted weighted speed. Step 502 is a step corresponding to step 306 or 307, and the engine unit 23 determines an angle. Step 501 and step 502 may be reversed in order.

In step 503, the controller control unit 24 determines an additive vector $$\vec{V}_a$$

by using the converted weighted speed determined in step 501, the angle determined in step 502, and expression (13).

In step 504, the controller control unit 24 determines a composite vector compose $(\vec{V})$ on the basis of the sum of the additive vector $$\vec{V}_a$$

determined in step 503 and the composite vector $$\vec{V}_h$$

determined and retained immediately before by the controller control unit 24 and retains the determined composite vector. This retained composite vector is the composite vector $$\vec{V}_h$$

that was determined and retained immediately before and that is to be referred to by the controller control unit 24 for processing in the next round of step 504.

In step 505, the flowchart returns to step 501 unless the process is terminated, for example, due to the termination of the game application. When this flowchart ends, the controller control unit 24 terminates the retention of the composite vector.

In an example, the angle and magnitude of the composite vector generated by the controller control unit 24 are converted into parameters of the operated character, such as the motion of the operated character. In an example, the application unit 25 executes processing so that the direction and magnitude of the composite vector determined at intervals of the frame time are reflected on the moving direction and moving speed, respectively, of the operated character at intervals of the frame time. In an example, the application unit 25 determines a moving state of the operated character on the basis of the magnitude of the composite vector. For example, the application unit 25 determines that "walking" is indicated (a) when the magnitude of the composite vector is less than or equal to a threshold t1, "fast walking" is indicated (b) when the magnitude of the composite vector is from the threshold t1 (exclusive) to a threshold t2 (inclusive), and "running" is indicated (c) when the magnitude of the composite vector is greater than the threshold t2.

Next, main operations and advantages of the electronic device 10 according to the embodiment of the present invention will be described. In this embodiment, the engine unit 23 acquires data points on the basis of touch events resulting from a user operation on the touchscreen 12 and stores the data points in the first buffer. The engine unit 23 retains, in a second buffer at intervals of the frame time, a data point sequence composed of the data points retained in the first buffer. The engine unit 23 determines, on the basis of the displacement of the data points in the data point sequence retained in the second buffer, a displacement speed in that data point sequence at intervals of the frame time by using the CPD function. Furthermore, the engine unit 23 determines a weighted speed on the basis of at least a bias (deviation) of the latest determined displacement speed relative to the average of the previously determined displacement speeds. The controller control unit 24, at intervals of the frame time, determines values corresponding to input values and inputs the determined weighted speed into the activation function f(s,p), thereby determining a converted weighted speed.

When the displacement speed for each frame retains a value greater than the average of the displacement speeds up to the immediately preceding frame, the CPD function outputs the greater value. In the case where the user swiftly moves a finger intentionally, the finger is accelerated for a certain time period as a natural consequence, which causes the CPD function to output a greater value. In the case where the displacement speed becomes great only in the time period of one frame due to the contact situation between the touchscreen 12 and the finger, the CPD function applies leveling to the displacement speed by multiplying the displacement speed by 1/n and thus does not output an extremely great value particularly when the value of n is the maximum value. As described above, the output value of the CPD function takes a great value in the case where a finger movement is continuously being accelerated intentionally and otherwise does not take a great value, which makes it possible to achieve a magnitude in accordance with an intuitive user operation. Furthermore, because the CPD function absorbs the habits and personal differences in the speed of moving a finger among individual users by using a bias (deviation) with respect to the average value, it becomes possible for the electronic device 10 to detect only intentional acceleration by using the CPD function.

On the other hand, because the CPD function continuously calculates values on a frame by frame basis, it often outputs values that vary discontinuously in response to discontinuous movements of the user's finger. In this embodiment, the output of the CPD function is input into the activation function f(s,p), which has a ratchet-like characteristic of outputting a value that is not less than the value p that was output immediately before, whereby it is possible to convert the output value of the CPD function into a more stable output value. With such a configuration, an output value of the CPD function reflecting the speed of a discontinuous finger movement can be converted into a more stable output value.

Also, in this embodiment, the activation function f(s,p) terminates the retention of the maximum value when a touch event identified as a touch end event or a touch cancel event is generated by a user operation on the touchscreen 12. With such a configuration, an unstable output value of the CPD function reflecting the speed of a discontinuous finger movement can be converted into a stable output value only while a touch continues, and the output value can be set to zero as soon as the continuous touch is terminated.

In addition, in this embodiment, among the data points retained in the first buffer, the engine unit 23 terminates the retention of data points for which a predetermined retention time period has expired. The engine unit 23 determines the slope of a regression line on the basis of the data points retained in the first buffer. The engine unit 23 determines, on the basis of a displacement direction taken as the set of data points, the amount of rotation that indicates whether or not to rotate the regression line by 180 degrees relative to the determined slope of the regression line. The engine unit 23 determines an angle on the basis of the determined slope of the regression line and the determined amount of rotation. The controller control unit 24 outputs a composite vector on the basis of the determined converted weighted speed and a unit vector with the determined angle. The controller control unit 24 preferably outputs a composite vector by using expression (13). In this way, in this embodiment, it is possible to determine (output) a composite vector with the direction and magnitude intended by the user who has performed a touch operation on the touchscreen 12.

With this configuration for outputting a composite vector, it is possible to convert the values of the angle and the speed (weighted speed) determined (calculated) by the engine unit 23 into parameters of the operated character, such as the motion of the operated character. Alternatively, it is possible to convert the values of the angle and the speed (weighted speed) determined (calculated) by the engine unit 23 into inputs of the direction and the magnitude of the virtual controller. This makes it possible to realize a virtual controller that is more responsive and more compatible with the user's intuition. For example, a composite vector has an additive vector continuously added thereto while the touch continues, but if a finger is rolled in the direction $\alpha$ and then rolled in the direction $\beta$, which is opposite to the direction $\alpha$, the magnitude of the composite vector becomes temporarily smaller, as shown in expression (13). Thereafter, the composite vector becomes a vector that has a greater norm oriented in the direction $\beta$, which conforms to the user's intuition.

Note that this embodiment is configured so that the engine unit 23 continuously calculates angles and weighted speeds on the basis of touch events generated in a very short time period. For this reason, it is possible to calculate an input of the angle and the magnitude of the virtual controller or parameters of the operated character, without using past touch coordinates as a reference point. Thus, in this embodiment, the electronic device 10 calculates an angle and a magnitude without using the spatial concept of points, such as a start point (start coordinates) and an end point (end coordinates), which were used in virtual controllers based on the conventional technology.

Also, unlike a virtual controller in the conventional technology, the electronic device 10 in this embodiment is not based on an input according to the moving distance of a finger from reference coordinates and hence can realize an operation intended by the user by means of an operation based on a smaller finger movement. Therefore, it is possible to realize this embodiment with a smaller mounting area of a touchscreen than in conventional technologies. For example, it is possible to realize the same operability regardless of the size of the touchscreen 12.

The operations and advantages described above also apply similarly to other embodiments and other examples unless otherwise specifically mentioned.

Another embodiment of the present invention may be a program for realizing the functions or the information processing shown in the flowchart in the above-described embodiment of the present invention, or a computer-readable storage medium storing the program. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

Now, modifications of the embodiments of the present invention will be described. Differences from the embodiment according to the present invention will be mainly described below. The modifications described below can be combined as appropriate and applied to any embodiment or modification of the present invention as long as no inconsistency arises.

In one modification, the predetermined function, instead of being configured as in expression (12), is configured to determine a value corresponding to an input value by determining, in response to an input value equal to or greater than a predetermined threshold value, a constant of a magnitude according to the predetermined threshold value. For example, the predetermined function is an activation function $f_1(s,p)$ defined by expression (14). Here, s and p are the same as in the case of f(s,p) in expression (12), where s, which is the output value of the CPD function, is an input and p is the value that was output immediately before by $f_1(s,p)$.

$$f_1(s, p) = \begin{cases} a_1, & s \leq t_1 \wedge p < b_1 \\ b_1, & (t_1 < s \leq t_2 \wedge p < 1.0) \vee (s \leq t_2 \wedge b_1 \leq p < 1.0) \\ 1.0, & s > t_2 \vee p \geq 1.0 \end{cases} \quad (14)$$

Figure 11:
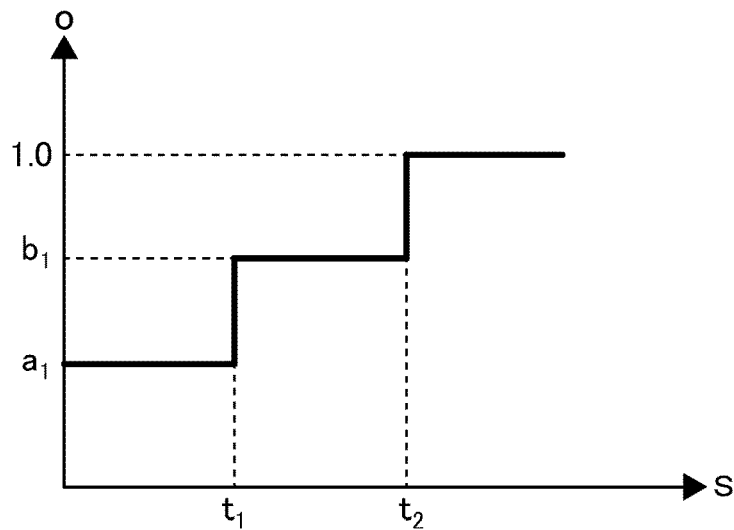
FIG. 11 is an example showing the relationship between an input s to an activation function $f_1(s,p)$ and a value o determined in response to the input s.

The activation function $f_1(s,p)$ takes s as an input, compares s with threshold values $t_1$ and $t_2$ ($t_1 < t_2$), and further compares the value of p with $b_1$ and 1.0, thereby outputting (determining) one of the real number $a_1$, the real number $b_1$, and 1.0 ($a_1 < b_1 < 1.0$). Alternatively, the activation function $f_1(s,p)$ takes s as an input and compares s with the threshold values $t_1$ and $t_2$, thereby determining o, which is one of the real number $a_1$, the real number $b_1$, and 1.0, and outputting the greater of o and p. While a touch continues, $f_1(s,p)$ outputs $a_1$ if s has never exceeded $t_1$, outputs $b_1$ thereafter if s is greater than $t_1$ one time but does not exceed $t_2$, and outputs 1.0 thereafter if s is greater than $t_2$ one time. FIG. 11 shows an example of the relationship between an input s to the activation function $f_1(s,p)$ and a value o to be determined in response to the input s.

In this manner, with a configuration in which the output value of the CPD function reflecting the speed of a discontinuous finger movement is converted into a plurality of stepwise values according to the magnitude of the output value, it is possible to convert the output value into a more stable output value.

In one modification, the predetermined function, instead of being configured as expression (12), is configured to determine a value corresponding to an input value by applying a function for mapping one input value to one value within a certain range. For example, the predetermined function is an activation function $f_2(s,p)$ defined by expression (15). Here s and p are the same as in the case of $f(s,p)$ in expression (12), where s, which is the output value of the CPD function, is an input and p is the value that was output immediately before by $f_1(s,p)$.

$$f_2(s, p) = \begin{cases} p, & a_2 s + b_2 < p \\ a_2 s + b_2, & a_2 s + b_2 \geq p \end{cases} \quad (15)$$

Figure 12:
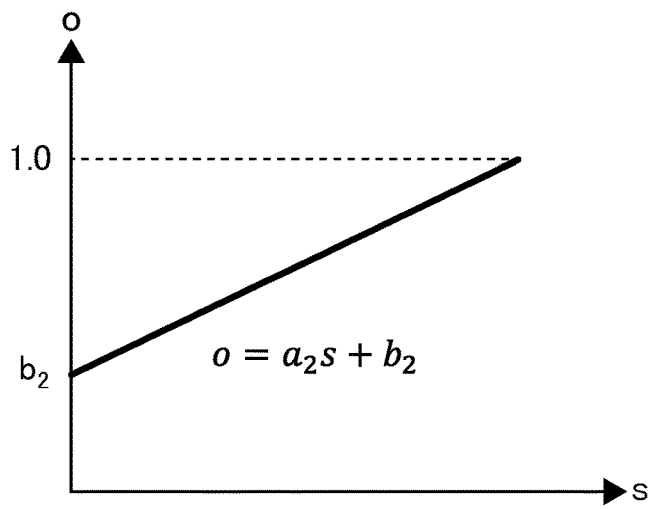
FIG. 12 is an example showing the relationship between an input s to an activation function $f_2(s,p)$ and a value o determined in response to the input s.

With s as an input, the activation function $f_2(s,p)$ determines a value $o = a_2 s + b_2$ and outputs (determines) the greater of o and p. FIG. 12 is an example showing the relationship between an input s to the activation function $f_2(s,p)$ and a value o determined in response to the input s.

Also, for example, the predetermined function is an activation function $f_2(s,p)$ defined by expression (16). s and p are the same as in the case of $f(s,p)$ in expression (12), where s, which is the output value of the CPD function, is an input and p is the value that was output immediately before by $f_1(s,p)$.

$$f_3(s, p) = \begin{cases} p, & a_3 e^s + b_3 < p \\ a_3 e^s + b_3, & a_3 e^s + b_3 \geq p \end{cases} \quad (16)$$

Figure 13:
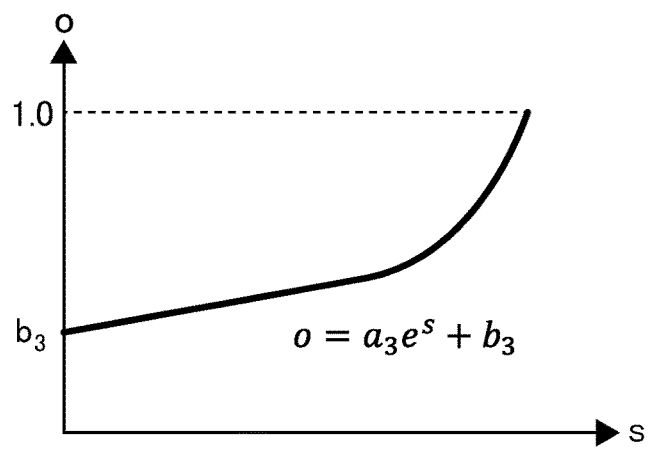
FIG. 13 is an example showing the relationship between an input s to the activation function $f_3(s,p)$ and a value o determined in response to the input s.

The activation function $f_3(s,p)$ takes s as an input, determines the value $o = a_3 e^s + b_3$, and then outputs (determines) the greater of o and p. FIG. 13 shows an example of the relationship between an input s to the activation function $f_3(s,p)$ and a value o to be determined in response to the input s.

With such a configuration, it is possible to realize a desired motion of the operated character while converting an output value of the CPD function reflecting the speed of a discontinuous finger movement into a more stable output value.

In one modification, the engine unit 23 retains data point sequences in the second buffer at predetermined timings, such as at intervals of a predetermined time period different from the time period corresponding to the frame rate. The engine unit 23 determines a displacement speed at predetermined timings, such as at intervals of a predetermined time period different from the time period corresponding to the frame rate, thus determining a weighted speed. The controller control unit 24 determines a converted weighted speed at predetermined timings, such as at intervals of a predetermined time period different from the time period corresponding to the frame rate. The controller control unit 24 generates a composite vector at predetermined timings, such as at intervals of a predetermined time period different from the time period corresponding to the frame rate.

In one modification, the first buffer includes a buffer A for determining the weighted speed and a buffer B for determining the angle. For example, the two buffers A and B are configured to have different retention time periods. The engine unit 23 retains, in the second buffer, a data point sequence composed of one or more data points retained in the buffer A.

In one modification, the engine unit 23 defines a variable V and, if the variance of the independent variable is equal to or greater than V, calculates and determines the angle by using the function aop(x,y). If the variance of the independent variable is less than V, the engine unit 23 determines the retained angle without calculating an angle. When the variance of the independent variable is less than V, it means that the n data points P are locally concentrated. Therefore, by determining the variable V, the engine unit 23 can ignore finger movements that are too minute, thereby calculating a stable angle. For example, the variable V is set to 0.7.

In one modification, the engine unit 23 calculates the slope of the regression line using a known method other than the least-squares method. In this case, the engine unit 23 does not determine the amount of rotation that indicates whether or not to rotate the regression line by 180 degrees relative to the determined slope of the regression line and, accordingly, sets neither the axis for the independent variable nor the axis for the dependent variable. For example, algorithms such as Kalman filtering or particle filters can be used.

In one modification, the engine unit 23 does not determine the variable Da and, among the data points retained in the first buffer, does not terminate the retention of data points for which it is determined that the predetermined retention time period has expired. In this case, the engine unit 23 determines the angle by referring to the data points that are stored in specific time zones that are shifted from one another by a predetermined amount of time.

In one modification, when acquiring a touch event, the engine unit 23 acquires a pair of numerical values (x, y) consisting of two variables and stores the pair of numerical values (x, y) consisting of two variables in the first buffer without associating them with the data point acquisition time t. For example, the engine unit 23 can store information corresponding to the data point acquisition time t in a memory area or the like, other than the first buffer, in the storage device 14 and manage the data point acquisition time t by associating t with the data stored in the first buffer.

The processing or operation described above may be modified freely as long as no inconsistency arises in the processing or operation, such as an inconsistency that a certain step utilizes data that cannot yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Electronic device
11 Processor
12 Input device, touchscreen
13 Display device
14 Storage device
15 Communication device
16 Bus
21 Input unit
22 Display unit
23 Engine unit
24 Controller control unit
25 Application unit

The invention claimed is:

1. A method executed in a computer provided with a touchscreen, the method comprising:
    a step of retaining, as a data point sequence at intervals of a predetermined time period, at least one data point that is acquired on the basis of a touch event generated by a user operation on the touchscreen and that is indicated by a value on a first axis and a value on a second axis;
    a step of determining, on the basis of a displacement of the at least one retained data point in the data point sequence, a displacement speed corresponding to a speed of displacement of the position, in the data point sequence, at which the touch event has been generated and determining a weighted speed on the basis of at least a bias of the latest determined displacement speed with respect to the mean value of displacement speeds determined before the latest displacement speed; and
    a step of inputting the determined weighted speed into a predetermined function that determines a value corresponding to an input value and that retains and determines a maximum value among at least one of the determined value, thereby determining a converted weighted speed for determining a parameter of an operated object in a virtual space.

2. The method according to claim 1,
    wherein, in the step of retaining as a data point sequence, at least one data point is retained as a data point sequence at intervals of the time period corresponding to a frame rate, and
    in the step of determining a weighted speed, a displacement speed corresponding to a speed of displacement of the position in one frame at which the touch event has been generated is determined on the basis of a displacement of the at least one data point in the data point sequence retained in the time period of the one frame, and a weighted speed is determined on the basis of at least a bias of the displacement speed in the latest frame with respect to the mean value of the displacement speeds in frames before the latest frame.

3. The method according to claim 1, comprising:
    a step of terminating the retention of the maximum value by means of the predetermined function when a touch event corresponding to touch end or touch cancel is generated by a user operation on the touchscreen.

4. The method according to claim 1, wherein the predetermined function is configured to determine a value corresponding to an input value by determining, in response to an input value equal to or greater than a predetermined threshold value, a constant having a magnitude according to the predetermined threshold value.

5. The method according to claim 1, wherein the predetermined function is configured to determine a value corresponding to an input value by applying a function for mapping one input value to one value within a certain range.

6. The method according to claim 1, comprising:
    a step of retaining a data point that is acquired on the basis of a touch event generated by a user operation on the touchscreen and that is indicated by a value on the first axis and a value on the second axis;
    a step of terminating the retention of a data point for which a predetermined retention time period has expired among a plurality of the retained data points;
    a step of determining the slope of a regression line on the basis of the plurality of retained data points;
    a step of determining an amount of rotation for rotating the determined slope of the regression line on the basis of a displacement direction as a set of the plurality of retained data points; and
    a step of determining, at intervals of the predetermined time period, an angle on the basis of the determined slope of the regression line and the determined amount of rotation.

7. The method according to claim 6,
    wherein in each of the step of determining a converted weighted speed and the step of determining an angle, the converted weighted speed and the angle are determined at intervals of the predetermined time period, and
    the method includes a step of generating a composite vector at intervals of the predetermined time period on the basis of the determined converted weighted speed and a unit vector having the determined angle.

8. The method according to claim 7, wherein a direction of the determined composite vector is a moving direction of the operated object, and a magnitude of the determined composite vector is a moving speed of the operated object.

9. The method according to claim 8, comprising: a step of determining a moving state of the operated object on the basis of the magnitude of the determined composite vector.

10. A non-transitory computer readable medium storing a program for causing a computer to execute each of the steps of the method according to claim 1.

11. An electronic device provided with a touchscreen, the electronic device comprising:
    a functional unit for retaining, as a data point sequence at intervals of a predetermined time period, at least one data point that is acquired on the basis of a touch event generated by a user operation on the touchscreen and that is indicated by a value on a first axis and a value on a second axis;
    a functional unit for determining, on the basis of a displacement of the at least one retained data point in the data point sequence, a displacement speed corresponding to a speed of displacement of the position, in the data point sequence, at which the touch event has been generated and determining a weighted speed on the basis of at least a bias of the latest determined displacement speed with respect to the mean value of displacement speeds determined before the latest displacement speed; and
    a functional unit for inputting the determined weighted speed into a predetermined function that determines a value corresponding to an input value and that retains and determines a maximum value among at least one of the determined value, thereby determining a converted weighted speed for determining a parameter of an operated object in a virtual space.

* * * * *